United States Patent
Inaba

(10) Patent No.: US 10,166,838 B2
(45) Date of Patent: Jan. 1, 2019

(54) AIR CONDITIONER FOR VEHICLE

(71) Applicant: DENSO CORPORATION, Kariya, Aichi-pref. (JP)

(72) Inventor: Atsushi Inaba, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 1107 days.

(21) Appl. No.: 14/363,438

(22) PCT Filed: Dec. 7, 2012

(86) PCT No.: PCT/JP2012/007837
§ 371 (c)(1),
(2) Date: Jun. 6, 2014

(87) PCT Pub. No.: WO2013/084502
PCT Pub. Date: Jun. 13, 2013

(65) Prior Publication Data
US 2014/0360215 A1 Dec. 11, 2014

(30) Foreign Application Priority Data
Dec. 9, 2011 (JP) ................................. 2011-270129

(51) Int. Cl.
*B60H 1/00* (2006.01)
*B60H 1/32* (2006.01)

(52) U.S. Cl.
CPC ..... *B60H 1/00885* (2013.01); *B60H 1/00485* (2013.01); *B60H 1/3207* (2013.01);
(Continued)

(58) Field of Classification Search
CPC ........... B60H 1/3207; F25B 2400/0409; F25B 2700/2106; F25B 2700/21171
See application file for complete search history.

(56) References Cited

U.S. PATENT DOCUMENTS 4,230,470 A * 10/1980 Matsuda .................. F25B 5/00
62/117
4,715,190 A * 12/1987 Han ...................... F25B 49/022
62/201
(Continued)

FOREIGN PATENT DOCUMENTS

EP 2068098 A1 * 6/2009 .............. F25B 9/008
GB 817909 A * 8/1959 ......... G05D 23/1919
(Continued)

OTHER PUBLICATIONS

Michael L Grady, Vehicle Air Quality with Fractional Air Recirculation, Apr. 8, 2013.*
(Continued)

*Primary Examiner* — Kun Kai Ma
(74) *Attorney, Agent, or Firm* — Harness, Dickey & Pierce, P.L.C.

(57) ABSTRACT

When a refrigerant evaporation temperature of an interior evaporator cannot be set lower than a dew-point temperature of air flowing into the interior evaporator in a heating operation, a refrigerant circuit is switched to a normal heating operation mode in which a flow rate of the refrigerant flowing into the interior evaporator is set to zero by allowing the refrigerant to flow toward a bypass passage. In a case where the air cannot be dehumidified by the interior evaporator, an unnecessary heat exchange between the air and the refrigerant in the interior evaporator can be suppressed. Thus, the energy of the vehicle air conditioner can be effectively prevented from being wasted.

8 Claims, 10 Drawing Sheets

(52) U.S. Cl.
CPC ............... *B60H 2001/3245* (2013.01); *B60H 2001/3283* (2013.01); *F25B 2400/0409* (2013.01); *F25B 2400/0411* (2013.01); *F25B 2600/021* (2013.01); *F25B 2600/111* (2013.01); *F25B 2600/112* (2013.01); *F25B 2600/2501* (2013.01); *F25B 2600/2513* (2013.01); *F25B 2700/2104* (2013.01); *F25B 2700/2106* (2013.01); *F25B 2700/21152* (2013.01); *F25B 2700/21161* (2013.01); *F25B 2700/21171* (2013.01)

(56) References Cited

U.S. PATENT DOCUMENTS

| | | | | |
|---|---|---|---|---|
| 4,934,155 | A * | 6/1990 | Lowes | F25B 41/04 62/197 |
| 6,467,288 | B2 * | 10/2002 | Kuroki | F25B 9/008 62/184 |
| 7,730,731 | B1 * | 6/2010 | Bash | F25B 5/04 62/198 |
| 2001/0049943 | A1 * | 12/2001 | Nakamura | B60H 1/3207 62/176.6 |
| 2002/0036080 | A1 * | 3/2002 | Itoh | B60H 1/00392 165/202 |
| 2003/0089788 | A1 * | 5/2003 | Ohga | B60H 1/00828 236/49.3 |
| 2003/0127527 | A1 * | 7/2003 | Ichishi | B60H 1/00735 236/49.3 |
| 2003/0209032 | A1 * | 11/2003 | Ohta | B60H 1/3211 62/500 |
| 2004/0129012 | A1 * | 7/2004 | Feuerecker | B60H 1/00914 62/278 |
| 2004/0261448 | A1 * | 12/2004 | Nishijima | F25B 41/00 62/500 |
| 2005/0045322 | A1 * | 3/2005 | Yoshida | B60H 1/00785 165/202 |
| 2005/0072852 | A1 * | 4/2005 | An | F25D 23/126 236/91 R |
| 2006/0272342 | A1 * | 12/2006 | Bash | F24F 11/0012 62/228.4 |
| 2007/0022777 | A1 * | 2/2007 | Takegami | F25B 13/00 62/498 |
| 2007/0151266 | A1 * | 7/2007 | Yakumaru | F25B 1/10 62/197 |
| 2007/0209387 | A1 * | 9/2007 | Hirota | F25B 41/062 62/527 |
| 2008/0041071 | A1 * | 2/2008 | Itoh | B60H 1/00342 62/79 |
| 2008/0066477 | A1 * | 3/2008 | Aoki | B60H 1/00785 62/150 |
| 2008/0178621 | A1 * | 7/2008 | Kang | F25B 5/04 62/179 |
| 2008/0295535 | A1 * | 12/2008 | Robinet | B60H 1/00278 62/259.2 |
| 2009/0260379 | A1 * | 10/2009 | Kim | F25D 11/022 62/196.1 |
| 2010/0152903 | A1 * | 6/2010 | Takenaka | F25B 9/008 700/275 |
| 2010/0162751 | A1 * | 7/2010 | Nishijima | F25B 1/10 62/500 |
| 2010/0326127 | A1 * | 12/2010 | Oomura | B60H 1/00785 62/498 |
| 2011/0016896 | A1 * | 1/2011 | Oomura | B60H 1/00785 62/155 |
| 2011/0023533 | A1 * | 2/2011 | Shimazu | F25B 1/10 62/498 |
| 2012/0160470 | A1 * | 6/2012 | Misumi | B60H 1/3207 165/287 |
| 2013/0312442 | A1 * | 11/2013 | Suzuki | B60H 1/00921 62/160 |

FOREIGN PATENT DOCUMENTS

| | | | |
|---|---|---|---|
| JP | H0995123 A | 4/1997 | |
| JP | WO 0007836 A1 * | 2/2000 | ........... B60H 1/3207 |
| JP | 2004182204 A | 7/2004 | |
| JP | 2011240725 A | 12/2011 | |
| WO | WO-0007836 A1 | 2/2000 | |

OTHER PUBLICATIONS

Shinichi Hara, Naoto Hayashi, Air Conditioning Device for Vehicle Use, Nov. 2016, Schreiber Translations, Inc. (WO-0007826A1 Translation).*

International Search Report and Written Opinion (in Japanese with English Translation) for PCT/JP2012/007837, dated Mar. 12, 2013; ISA/JP.

* cited by examiner

COOLING OPERATION MODE/
DEHUMIDIFICATION HEATING OPERATION MODE

NORMAL HEATING OPERATION MODE

COOLING OPERATION MODE

NORMAL HEATING OPERATION MODE

DEHUMIDIFICATION HEATING OPERATION MODE
(FIRST DEHUMIDIFICATION HEATING MODE)

DEHUMIDIFICATION HEATING OPERATION MODE
(SECOND DEHUMIDIFICATION HEATING MODE)

DEHUMIDIFICATION HEATING OPERATION MODE
(THIRD DEHUMIDIFICATION HEATING MODE)

DEHUMIDIFICATION HEATING OPERATION MODE
(FOURTH DEHUMIDIFICATION HEATING MODE)

(a)

(b)

AIR CONDITIONER FOR VEHICLE

CROSS REFERENCE TO RELATED APPLICATIONS

This application is a U.S. National Phase Application under 35 U.S.C. 371 of International Application No. PCT/JP2012/007837 filed on Dec. 7, 2012 and published in Japanese as WO/2013/084502 A1 on Jun. 13, 2013. This application is based on Japanese Patent Applications No. 2011-270129 filed on Dec. 9, 2011. The disclosures of all of the above applications are incorporated herein by reference.

FIELD OF THE INVENTION

The present disclosure relates to a vehicle air conditioner for cooling air to be blown into a vehicle interior in a vapor compression refrigeration cycle.

BACKGROUND ART

Patent Document 1 conventionally discloses a vehicle air conditioner including an evaporator of a refrigeration cycle, serving as a heat exchanger for cooling air to be blown into an interior of a vehicle. The vehicle air conditioner is adapted to suppress the generation of bad odor from the air at the evaporator.

The reason for generation of such bad odor is that material causing the bad odor is attached to an outer surface of the evaporator when the air is cooled down to the dew-point temperature or less and condensed by the evaporator. The bad odor of the air is known to become stronger especially when the outer surface of the evaporator with the material causing the bad odor is dried or gets wet.

The vehicle air conditioner disclosed in Patent Document 1 controls a refrigerant discharge capacity of a compressor of the refrigeration cycle such that a refrigerant evaporation temperature at the evaporator is higher or lower only by a predetermined temperature than the dew-point temperature of the air flowing into the evaporator. Thus, the outer surface of the evaporator can be prevented from being repeatedly dried and getting wet to thereby suppress the generation of the bad odor from the air.

PRIOR ART LIST

Patent Document

Patent Document 1: WO/00/07836

SUMMARY OF INVENTION

For example, when dehumidifying and heating the vehicle interior using the vehicle air conditioner disclosed in Patent Document 1, the refrigerant evaporation temperature at the evaporator can be set lower than the dew-point temperature of the air flowing into the evaporator, and the air cooled by the evaporator can be heated to a desired temperature by a heater, such as a heater core.

The inventors of the present application, however, have found through studies that a refrigerant evaporation temperature at the evaporator cannot often be set lower than the dew-point temperature of the air flowing into the evaporator. For example, in the vehicle air conditioner, the refrigerant evaporation temperature of the evaporator has a lower limit temperature (for example, 1° C.) set so as to prevent the frost formation of the evaporator. When the dew-point temperature is decreased due to a decrease in temperature of air flowing into the evaporator, the refrigerant evaporation temperature at the evaporator cannot be lower than the dew-point temperature of the air flowing into the evaporator.

When dehumidifying and heating the vehicle interior using the vehicle air conditioner disclosed in Patent Document 1, the air is often heated by the heater after being just cooled by the evaporator. In this case, the refrigeration cycle might be operated to waste the energy of the vehicle air conditioner.

In view of the foregoing matters, it is an object of the present disclosure to suppress waste of the energy in a vehicle air conditioner in which air to be blown into a vehicle interior is cooled by using a vapor compression refrigeration cycle.

According to a first aspect of the present disclosure, a vehicle air conditioner cools air to be blown into a vehicle interior by using a refrigeration cycle with an evaporator for evaporating refrigerant. The vehicle air conditioner includes a refrigerant flow-rate control portion controlling a flow rate of the refrigerant flowing into the evaporator, a dew-point temperature detection portion detecting a dew-point temperature of air flowing into the evaporator, and a determination portion determining whether the dew-point temperature detected by the dew-point temperature detection portion is equal to or less than a predetermined reference threshold. In the vehicle air conditioner, the refrigerant flow-rate control portion reduces the flow rate of the refrigerant flowing into the evaporator, when the determination portion determines that the dew-point temperature detected by the dew-point temperature detection portion is equal to or less than the predetermined reference threshold.

Thus, when the dew-point temperature of the air flowing into the evaporator is equal to or less than the predetermined reference threshold, the flow rate of refrigerant flowing into the evaporator can be decreased so as to suppress an unnecessary heat exchange between the air and the refrigerant at the evaporator even when the air cannot be dehumidified by the evaporator. Therefore, the energy consumed in the vehicle air conditioner can be effectively prevented from being wasted. The term "decrease" of the flow rate of refrigerant as used in the present disclosure includes setting of the flow rate of refrigerant to zero.

According to a second aspect of the present disclosure, the vehicle air conditioner may further include an evaporator temperature determination portion determining a target refrigerant-evaporation temperature at the evaporator. In this case, the predetermined reference threshold is the target refrigerant-evaporation temperature determined by the evaporator temperature determination portion.

Thus, in a case where the refrigerant evaporation temperature in the evaporator cannot be lower than the dew-point temperature of the air flowing into the evaporator, the flow rate of the refrigerant flowing into the evaporator can be decreased, thereby effectively suppressing the unnecessary heat exchange between the air and the refrigerant in the evaporator.

In a third aspect of the present disclosure, the evaporator temperature determination portion may determine the target refrigerant-evaporation temperature based on at least a physical quantity in correlation to a dehumidification load of the vehicle interior.

In this case, the target refrigerant-evaporation temperature of the evaporator is determined according to the dehumidification load of the vehicle interior, so that the air blown into the vehicle interior can be appropriately dehumidified at the evaporator. The term "dehumidification load" as used herein means the amount of heat required for the evaporator of the refrigeration cycle to generate in order to set the humidity of the vehicle interior to a desired one or to prevent the window fogging.

When the outside air temperature is decreased, for example, the temperature of a front windowpane of the vehicle is decreased, thereby easily causing the window fogging. In order to prevent the window fogging, it is necessary to decrease the refrigerant evaporation temperature of the evaporator. In other words, when the outside air temperature is decreased, in order to prevent the window fogging, it is necessary to increase the amount of heat generated by the evaporator, thus increasing a dehumidification load.

Thus, in a fourth aspect of the present disclosure, the evaporator temperature determination portion may determine the target refrigerant-evaporation temperature such that the target refrigerant-evaporation temperature is decreased in accordance with a decrease of outside air temperature. The term "outside air temperature" as used in the present disclosure may mean one example of the "physical quantities in correlation to the dehumidification load of the vehicle interior".

The vehicle interior is likely to have a higher humidity due to the influence of passenger's breath or sweat. When the ratio of the amount of the inside air to the outside air introduced into the evaporator is increased, in order to obtain the desired amount of dehumidification from the air at the evaporator, it is necessary to decrease the refrigerant evaporation temperature of the evaporator. In other words, when the ratio of the introduced amount of the inside air to the outside air into the evaporator is increased, the amount of heat generated by the evaporator needs to be increased to obtain the desired humidity of the vehicle interior, which leads to an increase in dehumidification load.

Thus, in a fifth aspect of the present disclosure, the evaporator temperature determination portion may determine the target refrigerant-evaporation temperature such that the target refrigerant-evaporation temperature is decreased according to an increase in ratio of introduction of inside air to outside air introduced into the evaporator. The term "ratio of introduction of inside air to outside air" may be one example of the "physical quantities in correlation to a dehumidification load of the vehicle interior".

When the target refrigerant-evaporation temperature is set to a level lower than 0° C., frost formation (frost) is likely to be formed on the surface of the evaporator. The frost formation might often interrupt the heat exchange between the refrigerant and the air at the evaporator.

For example, in a sixth aspect of the present disclosure, the evaporator temperature determination portion may determine the target refrigerant-evaporation temperature to be equal to or more than 0° C.

Alternatively, according to a seventh aspect of the present disclosure, the reference threshold may be a predetermined fixed threshold.

According to an eighth aspect of the present disclosure, the refrigeration cycle may include a bypass passage through which the refrigerant flows while bypassing the evaporator, and a refrigerant circuit switching portion switching between a refrigerant circuit for circulating the refrigerant to an evaporator side and another refrigerant circuit for circulating the refrigerant to a bypass passage side. When the dew-point temperature detected by the dew-point temperature detection portion is determined by the determination portion to be equal to or less than a predetermined reference threshold, the refrigerant flow-rate control portion may control an operation of the refrigerant circuit switching portion so as to allow the refrigerant to flow to the bypass passage.

In a ninth aspect of the present disclosure, the refrigeration cycle further includes a compressor for compressing and discharging the refrigerant. In this case, when the dew-point temperature detected by the dew-point temperature detection portion is determined by the determination portion to be equal to or less than the predetermined reference threshold, the refrigerant flow-rate control portion may reduce the refrigerant discharge capacity of the compressor.

In a tenth aspect of the present disclosure, the vehicle air conditioner may further include a heater heating air having cooled and dehumidified by the evaporator.

In this case, the air dehumidified and cooled by the evaporator can be heated by the heater so as to perform the dehumidification heating operation of the vehicle interior.

DESCRIPTION OF EMBODIMENTS

Figure 1:
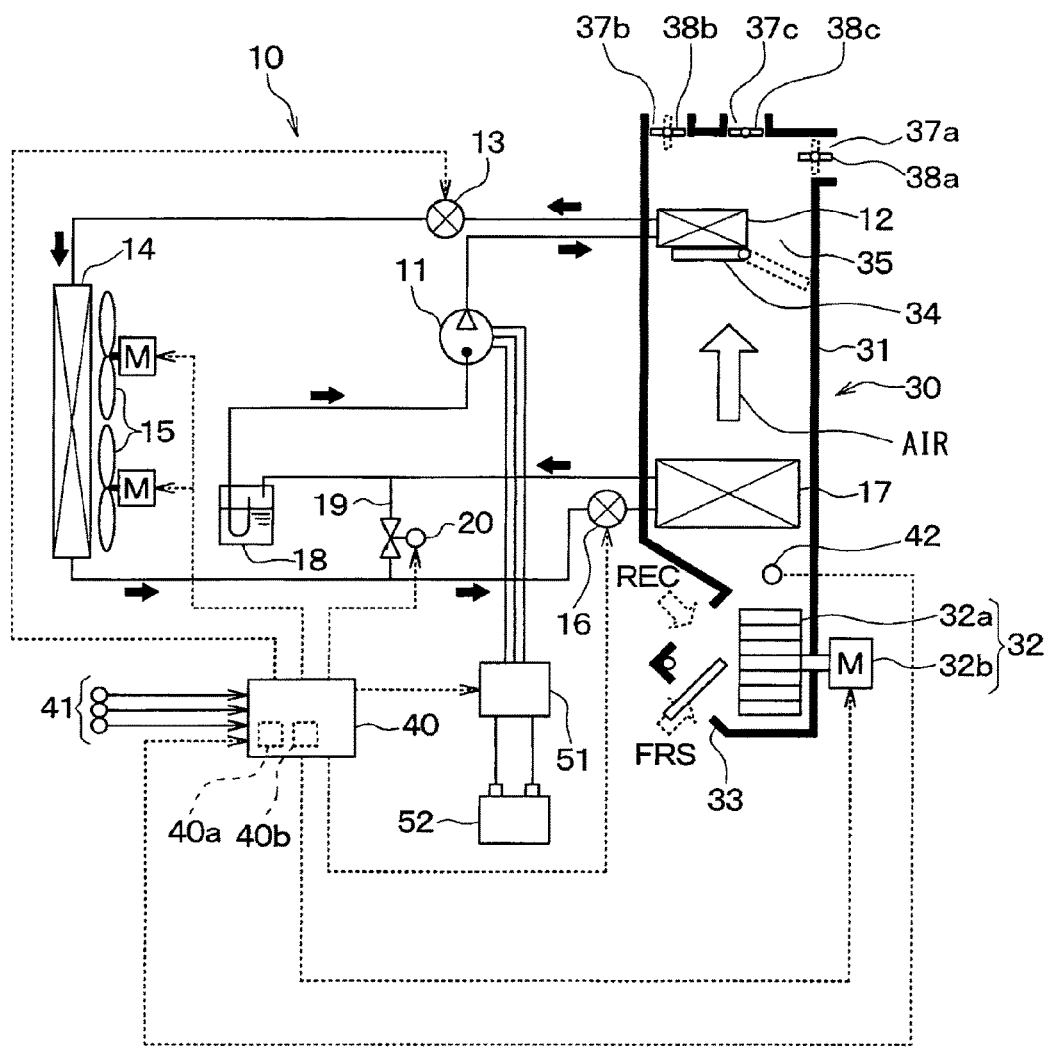
FIG. 1 is an entire configuration diagram showing a refrigerant circuit in a cooling operation mode and in a dehumidification heating operation mode of a refrigeration cycle according to a first embodiment of the present disclosure.

In the following, preferred embodiments of the present disclosure will be described with reference to the accompanying drawings. The same or equivalent parts in the embodiments below are indicated by the same reference characters throughout the figures.

First Embodiment

A first preferred embodiment of the present disclosure will be described with reference to FIGS. 1 to 12. In this embodiment, a vehicle air conditioner 1 of the present disclosure is applied to an electric car that obtains a driving force for traveling from an electric motor for traveling.

The vehicle air conditioner 1 includes a vapor compression refrigeration cycle (hereinafter simply referred to as a "refrigeration cycle") 10 for cooling or heating air to be blown into a vehicle interior, an interior air conditioning unit 30, and an air conditioning controller 40, as main components.

Figure 2:
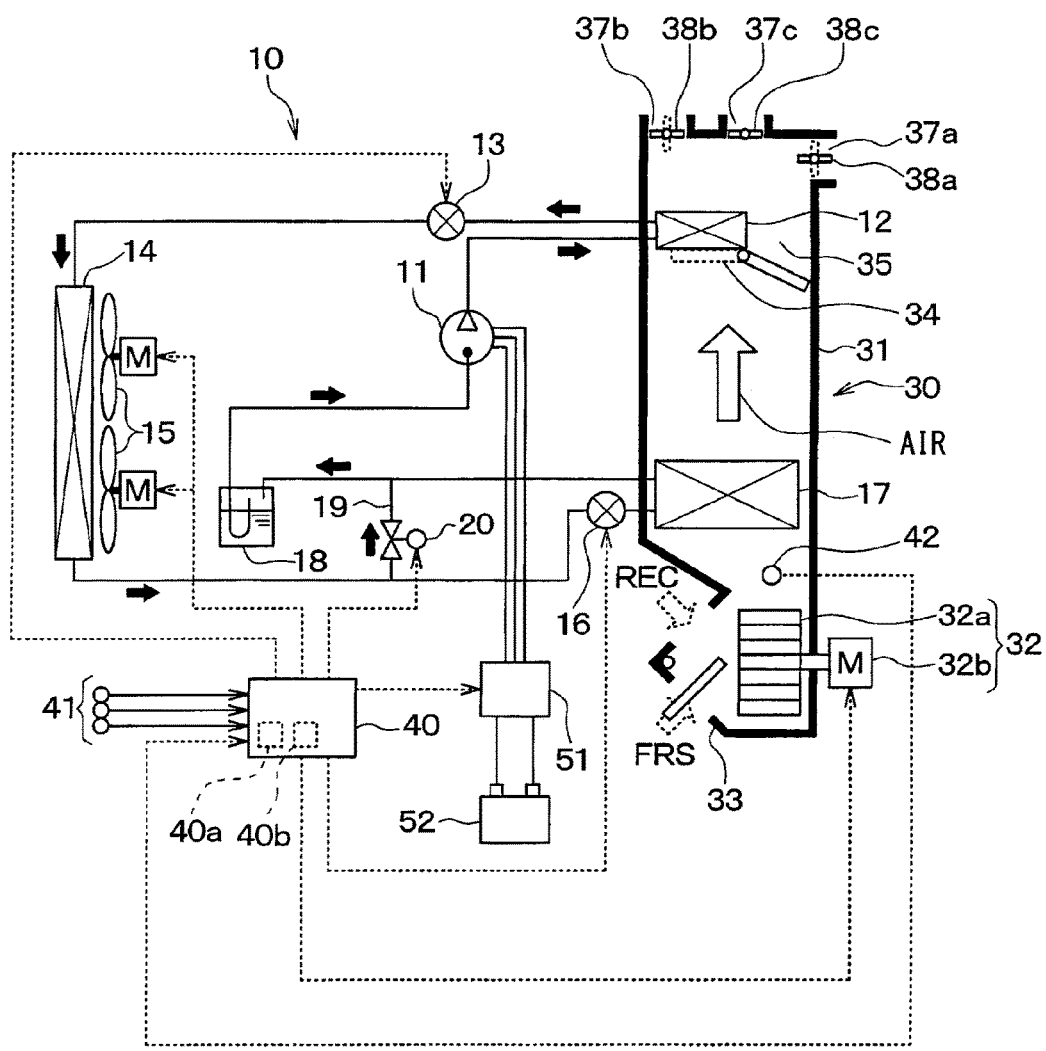
FIG. 2 is an entire configuration diagram showing a refrigerant circuit in a heating operation mode of the refrigeration cycle in the first embodiment.

The refrigeration cycle 10 can perform switching between a refrigerant circuit in a cooling operation mode for cooling the vehicle interior by cooling the air or in a dehumidification heating operation mode for heating and dehumidifying the vehicle interior as shown in the entire configuration diagram of FIG. 1, and another refrigerant circuit in a heating operation mode for heating the vehicle interior by heating the air as shown in the entire configuration diagram of FIG. 2.

The refrigeration cycle 10 of this embodiment employs a normal fluorocarbon refrigerant as the refrigerant, and forms a subcritical refrigeration cycle in which high-pressure side refrigerant pressure does not exceed the critical pressure of the refrigerant. Refrigerating machine oil for allowing the refrigerant to circulate through a compressor 11 is mixed into the refrigerant as will be described later, and a part of the refrigerating machine oil circulates through the cycle together with the refrigerant.

The compressor 11 among the components of the refrigeration cycle 10 is positioned within a bonnet of the vehicle, and is to suck, compress, and discharge the refrigerant in the refrigeration cycle 10. The compressor 11 is an electric compressor which drives a fixed displacement compression mechanism having a fixed discharge capacity by use of an electric motor. Specifically, various types of compression mechanisms, such as a scroll type compression mechanism, a vane compression mechanism, or a rolling piston compression mechanism, can be employed as the compression mechanism of the compressor 11.

The electric motor has its operation (number of revolutions) controlled by being supplied with power from an inverter 51 included in a motor driving portion. The inverter 51 controls the supply of power from a battery 52 for the electric motor in response to a control signal from the air conditioning controller 40. The number of revolutions of the electric motor is controlled by the inverter 51 to thereby change a refrigerant discharge capacity of the compressor 11. Thus, in this embodiment, the inverter 51 serves as discharge capacity changing means for the compressor 11.

The discharge port side of the compressor 11 is coupled to an inlet side of an interior condenser 12. The interior condenser 12 is disposed in a casing 31 of the interior air conditioning unit 30 to be described later. The interior condenser 12 is a heater for heating the air having passed through an interior evaporator 17 to be described later by dissipating heat from the refrigerant (high-pressure refrigerant) discharged from the compressor 11.

The outlet side of the interior condenser 12 is coupled to an inlet side of a first expansion valve 13. The first expansion valve 13 is an electric variable throttle mechanism which includes a valve body having variable throttle opening degrees, and an electric actuator constructed of a stepping motor for changing the throttle opening degree of the valve body.

The first expansion valve 13 of this embodiment is constructed of a variable throttle mechanism having a fully opening function of fully opening a refrigerant passage at the fully-opened throttle opening degree. That is, the first expansion valve 13 can be controlled not to exhibit the effect of decompressing the refrigerant. The first expansion valve 13 has its operation controlled by a control signal output from the air conditioning controller 40.

The refrigerant outlet side of the first expansion valve 13 is coupled to the refrigerant inlet side of an exterior heat exchanger 14. The exterior heat exchanger 14 is made to exchange heat between the refrigerant flowing there through and outside air blown from a blower fan 15. The exterior heat exchanger 14 serves as an evaporator for evaporating the refrigerant to exhibit a heat absorption effect in the heating operation mode, and also as a heat radiator for dissipating heat from the refrigerant in the cooling operation mode, as will be described later.

The refrigerant outlet side of the exterior heat exchanger 14 is coupled to the refrigerant inlet side of a second expansion valve 16. The second expansion valve 16 is an electric variable throttle mechanism which includes a valve body having variable throttle opening degrees, and an electric actuator constructed of a stepping motor for changing the throttle opening degree of the valve body.

The second expansion valve 16 of this embodiment is constructed of a variable throttle mechanism having a full opening function of fully opening a refrigerant passage at the fully-opened throttle opening, and a fully closing function of fully closing the refrigerant passage at the fully-closed throttle opening. That is, the second expansion valve 16 can also be controlled not to exhibit the effect of decompressing the refrigerant, like the first expansion valve 13. The second expansion valve 16 has its operation controlled by a control signal output from the air conditioning controller 40.

The refrigerant outlet side of the second expansion valve 16 is coupled to the refrigerant inlet side of the interior evaporator 17. The interior evaporator 17 is disposed on the upstream side of air flow of the interior condenser 12 within the casing 31 of the interior air conditioning unit 30. The interior evaporator 17 is an evaporator for cooling and dehumidifying the air before passing through the interior condenser 12 by evaporating the refrigerant passing through the evaporator to exhibit the heat absorption effect in the cooling operation mode and in the dehumidification heating operation mode.

The refrigerant outlet side of the interior evaporator 17 is coupled to a refrigerant inlet side of an accumulator 18. The accumulator 18 is a gas-liquid separator that separates the refrigerant flowing therein into liquid and gas phases to store therein the excessive refrigerant within the cycle. A vapor-phase refrigerant outlet of the accumulator 18 is coupled to a suction port side of the compressor 11. Thus, the accumulator 18 serves to suppress the suction of the liquid-phase refrigerant into the compressor 11 to thereby prevent the liquid compression at the compressor 11.

The refrigerant outlet side of the exterior heat exchanger 14 is coupled to a bypass passage 19 for allowing the refrigerant flowing from the exterior heat exchanger 14 to be guided to the refrigerant inlet of the accumulator 18 while bypassing the second expansion valve 16 and the interior evaporator 17.

The bypass passage 19 is provided with a bypass passage opening/closing valve 20 for opening and closing the bypass passage 19. The bypass passage opening/closing valve 20 is an electromagnetic valve for opening and closing the bypass passage 19, and has its operation controlled by a control signal output from the air conditioning controller 40.

When the bypass passage opening/closing valve 20 is opened and the second expansion valve 16 is closed, the refrigerant flowing from the exterior heat exchanger 14 flows into the accumulator 18 via the bypass passage 19. In contrast, when the bypass passage opening/closing valve 20 is closed and the second expansion valve 16 is opened, the refrigerant flowing from the exterior heat exchanger 14 flows into the interior evaporator 17 via the second expansion valve 16. Thus, the bypass passage opening/closing valve 20 and the second expansion valve 16 of this embodiment serve as a refrigerant circuit switching portion for switching between a refrigerant circuit for flowing the refrigerant to the interior evaporator side, and another refrigerant circuit for flowing the refrigerant to the bypass passage side.

The interior air conditioning unit 30 will be described below. The interior air conditioning unit 30 is disposed inside a gauge board (instrument panel) at the forefront of a vehicle compartment. The air conditioning portion 30 accommodates in the casing 31 forming an outer envelope, a blower 32, the above-mentioned interior condenser 12, the interior evaporator 17, and the like.

The casing 31 forms an air passage for a flow of the air. The casing 31 is formed of resin (for example, polypropylene) having some degree of elasticity, and excellent strength. An inside/outside air switch 33 for switching between the air (inside air) in the vehicle interior and the outside air is disposed on the most upstream side of the air flow in the casing 31.

The inside/outside air switch 33 has an inside air introduction port for introducing inside air into the casing 31, and an outside air introduction port for introducing outside air into the casing 31. An inside/outside air switching door is positioned inside the inside/outside air switch 33 to continuously adjust the opening areas of the inside air introduction port and the outside air introduction port to thereby change the ratio of the introduced amount of the inside air to the outside air.

On the downstream side of air flow of the inside/outside air switch 33, the blower 32 is provided for blowing air introduced via the inside/outside air switch 33 toward the vehicle interior. The blower 32 is an electric blower that drives a centrifugal multi-blade fan (Sirocco fan) 32a by an electric motor 32b. The blower 32 has the number of revolutions (i.e., air blowing volume) controlled by a control signal (control voltage) output from the air conditioning controller 40 to be described later. The blower 32 serves as blowing means for blowing air to the vehicle interior.

The interior evaporator 17 and the interior condenser 12 are disposed on the downstream side of the air flow of the blower 32 in that order with respect to the flow of the air. In other words, the interior evaporator 17 is disposed on the upstream side in the flow direction of the air with respect to the interior condenser 12.

A cool air bypass passage 35 is provided in the casing 31 for allowing the air having passed through the interior evaporator 17 to flow while bypassing the interior condenser 12. An air mix door 34 is disposed on the downstream side of the air flow in the interior evaporator 17 and on the upstream side of the air flow in the interior condenser 12. The air mix door 34 adjusts the ratio of the volume of the air passing through the interior condenser 12 to that of the air passing through the cool air bypass passage 35 among the air having passed through the interior evaporator 17. A mixing space is provided on the downstream side of the air flow in the interior condenser 12 and on the downstream side of the air flow in the cool air bypass passage 35 so as to mix the air passing through the interior condenser 12 with the air passing through the cool air bypass passage 35.

Air outlets 37a to 37c for blowing the conditioned air mixed and conditioned in the mixing space, into the vehicle interior as a space to be conditioned are disposed on the most downstream side of the air flow in the casing 31. Specifically, the air outlets include a face air outlet 37a for blowing the conditioned air toward the upper body of a passenger in the vehicle compartment, a foot air outlet 37b for blowing the conditioned air toward the foot of the passenger, and a defroster air outlet 37c for blowing the conditioned air toward the inner side of a front windowpane of the vehicle.

Thus, the air mix door 34 adjusts the ratio of the volume of air passing through the interior condenser 12 to that of air passing through the cool air bypass passage 35 to thereby adjust the temperature of conditioned air mixed in the mixing space, thus controlling the temperature of the conditioned air blown from each air outlet. The air mix door 34 is driven by a servo motor (not shown) which is operated by a control signal output from the air conditioning controller 40.

A face door 38a for adjusting an opening area of the face air outlet 37a is positioned on the upstream side of the air flow of the face air outlet 37a. A foot door 38b for adjusting an opening area of the foot air outlet 37b is positioned on the upstream side of the air flow of the foot air outlet 37b. A defroster door 38c for adjusting an opening area of the defroster air outlet 37c is positioned on the upstream side of the air flow of the defroster air outlet 37c.

The face door 38a, the foot door 38b, and the defroster door 38c serve as an air outlet mode switching portion for switching among air outlet modes, and are driven via a link mechanism or the like by a servo motor (not shown) whose operation is controlled by a control signal output from the air conditioning controller 40 to be described later.

Next, an electric controller of this embodiment will be described below. The air conditioning controller 40 includes the well-known microcomputer, including a CPU, a ROM, and a RAM, and a peripheral circuit thereof. The air conditioning controller 40 performs various kinds of computations and processing based on control programs stored in the ROM to control the operations of various control devices connected to the output side.

A group of various sensors 41 for control of air conditioning is coupled to the input side of the air conditioning controller 40. The sensors include an inside air sensor for detecting an air temperature (inside air temperature) Tr inside of the vehicle, an outside air sensor for detecting an air temperature (outside air temperature) Tam outside of the vehicle, a solar radiation sensor for detecting an amount of solar radiation Ts in the vehicle interior, and an evaporator temperature sensor for detecting a temperature of blown air (refrigerant evaporation temperature) from the interior evaporator 17. The sensors also include a discharge temperature sensor for detecting the temperature of refrigerant discharged from the compressor 11, and a blown air temperature sensor for detecting the temperature of the air blown into the vehicle interior.

The input side of the air conditioning controller 40 of this embodiment is coupled to a temperature and humidity sensor 42 for detecting the dew-point temperature Tdew of air flowing into the interior evaporator 17. The temperature and humidity sensor 42 is constructed of a temperature sensor and a humidity sensor for respectively detecting the temperature and humidity of the air flowing into the interior evaporator 17.

An operation panel (not shown) is disposed near an instrument board at the front of the vehicle compartment, and coupled to the input side of the air conditioning controller 40. Operation signals are input from various types of operation switches provided on the operation panel. The various operation switches provided on the operation panel include, specifically, an A/C switch (air conditioner switch) for setting the possibility of cooling the air in the interior air conditioning unit 30, and a temperature setting switch for setting a preset temperature Tset of the vehicle interior.

The air conditioning controller 40 is integrally formed with control portions for controlling the operations of various control devices connected to the output side of the controller. The structure (software and hardware) for controlling the operation of each control device serves as the control portion for controlling the operation of each control component.

For example, the structure for controlling the electric motor of the compressor 11 and the inverter 51 serves as a discharge capacity control portion. The structure for controlling the first expansion valve 13 serves as a first throttle control portion. The structure for controlling the second expansion valve 16 and the bypass passage opening/closing valve 20 serves as a refrigerant circuit switching control portion. The structure of each of the discharge capacity control portion and refrigerant circuit switching control portion in the air conditioning controller 40 serves as a refrigerant flow-rate control portion 40a for controlling the flow rate of refrigerant flowing into the interior evaporator 17. The structure for calculating the dew-point temperature Tdew (dew-point temperature calculator) using a detection signal from the temperature and humidity sensor 42 in the air conditioning controller 40 serves as a dew-point temperature detection portion 40b together with the temperature and humidity sensor 42.

Figure 3:
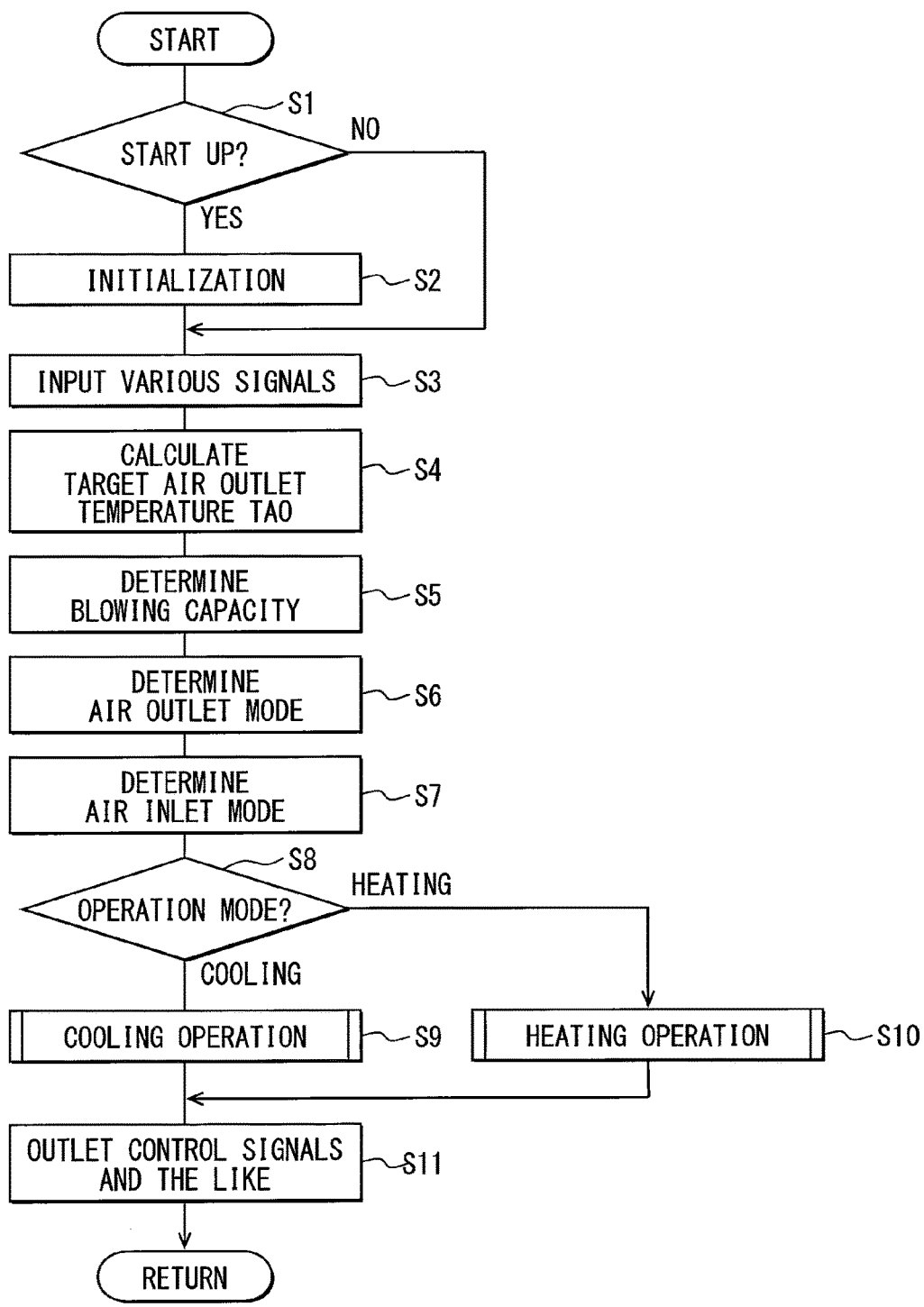
FIG. 3 is a flowchart showing the flow of a control process performed by an air conditioning controller in the first embodiment.

Next, the operation of the vehicle air conditioner 1 with the above arrangement in this embodiment will be described with reference to FIGS. 3 to 12. FIG. 3 is a flowchart showing the flow of a control process (main routine) performed by the air conditioning controller 40 in this embodiment. The control process is performed in a predetermined control cycle once the operation switch of the vehicle air conditioner 1 is turned on. Each control step in the respective flowcharts serves as each of various functional components included in the air conditioning controller 40.

In step S1, first, it is determined whether or not the vehicle air conditioner is started up. When the vehicle air conditioner is determined to be started up (if YES in step S1), the operation proceeds to step S2. When the vehicle air conditioner is determined not to be started up (if NO in step S1), the operation skips the process in step S2, and proceeds to step S3.

In step S2, initializing processes (initialization processes), including initializing of various types of flags, a timer, and initial positioning of the above various types of electric actuators, are performed, and then the operation proceeds to step S3.

In step S3, a signal indicative of an environmental state of the vehicle used for air conditioning control, and an operation signal of the operation panel switch are read in, and then the operation proceeds to step S4. In step S3, detection signals from the above-mentioned sensor group 41 for the air conditioning control and the temperature and humidity sensor 42 are read as the vehicle environmental state signal. And, an operation mode selected based on the preset temperature Tset of the vehicle interior set by the inside air temperature setting switch, and an On/Off state of the A/C switch are read as the operation signal of the operation panel.

Subsequently, in step S4, a target air outlet temperature TAO of the air blown into the vehicle interior via various air outlets 37a to 37c is calculated, and then the operation proceeds to step S5. The target air outlet temperature TAO of this embodiment is calculated using the preset temperature Tset of the vehicle interior, an inside air temperature Tr detected by the inside air sensor, an outside air temperature Tam detected by the outside air sensor, and a solar radiation amount Ts detected by the solar radiation sensor.

In step S5, a blowing capacity (air blowing volume) of the blower 32 is determined, and then the operation proceeds to step S6. Specifically, in step S5, a blower motor voltage to be applied to the electric motor and corresponding to the volume of air from the blower 32 is determined with reference to the control map (control characteristics) pre-stored in the air conditioning controller 40 based on the target air outlet temperature TAO calculated in step S4.

More specifically, in this embodiment, the blower motor voltage is set to a high level close to the maximum in an ultra-low temperature range and an ultra-high temperature range of the target air outlet temperature TAO, whereby the volume of air from the blower 32 is controlled to be at about the maximum level. As the target air outlet temperature TAO is increased from the ultra-low temperature range to an intermediate temperature range, the blower motor voltage is decreased with increasing target air outlet temperature TAO to thereby decrease the volume of the air from the blower 32.

As the target air outlet temperature TAO is decreased from the ultra-high temperature range to the intermediate temperature range, the blower motor voltage is decreased with decreasing target air outlet temperature TAO to thereby decrease the volume of air from the blower 32. When the target air outlet temperature TAO enters a predetermined intermediate temperature range, the blower motor voltage is minimized to thereby minimize the volume of air from the blower 32.

Subsequently, in step S6, an air outlet mode is determined, and then the operation proceeds to step S7. In step S6, the air outlet mode is determined based on the target air outlet temperature TAO with reference to the control map (control characteristics) pre-stored in the air conditioning controller 40. In this embodiment, as the TAO is increased from the low temperature range to the high temperature range, the air outlet mode is switched from a face mode to a bi-level mode and a foot mode in that order.

In step S7, an air inlet mode, that is, the switching state of the inside/outside air switch 33 is determined, and then the operation proceeds to step S8. In step S7, the air inlet mode is determined based on the target air outlet temperature TAO with reference to the control map (control characteristics) pre-stored in the air conditioning controller 40.

In this embodiment, an outside air introduction mode FRS for introducing air (outside air) outside of the vehicle compartment is preferentially selected. For example, when the target air outlet temperature TAO is in the ultra-low temperature range or the like, the outside air introduction mode is switched to an inside/outside air introduction mode R/F for respectively introducing the outside air and inside air, and an inside air circulation mode REC for introducing the inside air, in that order. The process in step S7 of this embodiment can be regarded as a process for determining the ratio of the introduction amount of the inside air to the outside air into the interior evaporator 17.

In step S8, an operation mode is determined based on the target air outlet temperature TAO and an operation signal (on/off state) of the A/C switch. For example, when the target air outlet temperature TAO is equal to or less than a predetermined temperature, and the A/C switch is turned on, the operation proceeds to step S9, in which a control process for the cooling operation mode is performed. The control process for the cooling operation mode will be described later.

In contrast, when the heating operation mode is selected, the operation proceeds to step S10, in which a control process for the heating operation mode is performed. The control process for the heating operation mode involves determining either the dehumidification heating operation mode (heating operation mode with the dehumidification process) for dehumidifying the air by the interior evaporator 17, or the normal heating operation mode (heating operation mode without the dehumidification process) without performing the dehumidification process of the air by the interior evaporator 17, and then performing the control process for the determined operation mode. In the normal heating operation mode (heating operation mode without the dehumidification process) of this embodiment, the bypass passage opening/closing valve 20 of the refrigeration cycle 10 is opened and the second expansion valve 16 is closed to perform switching to a refrigerant circuit not allowing the refrigerant to flow into the interior evaporator 17.

Figure 4:
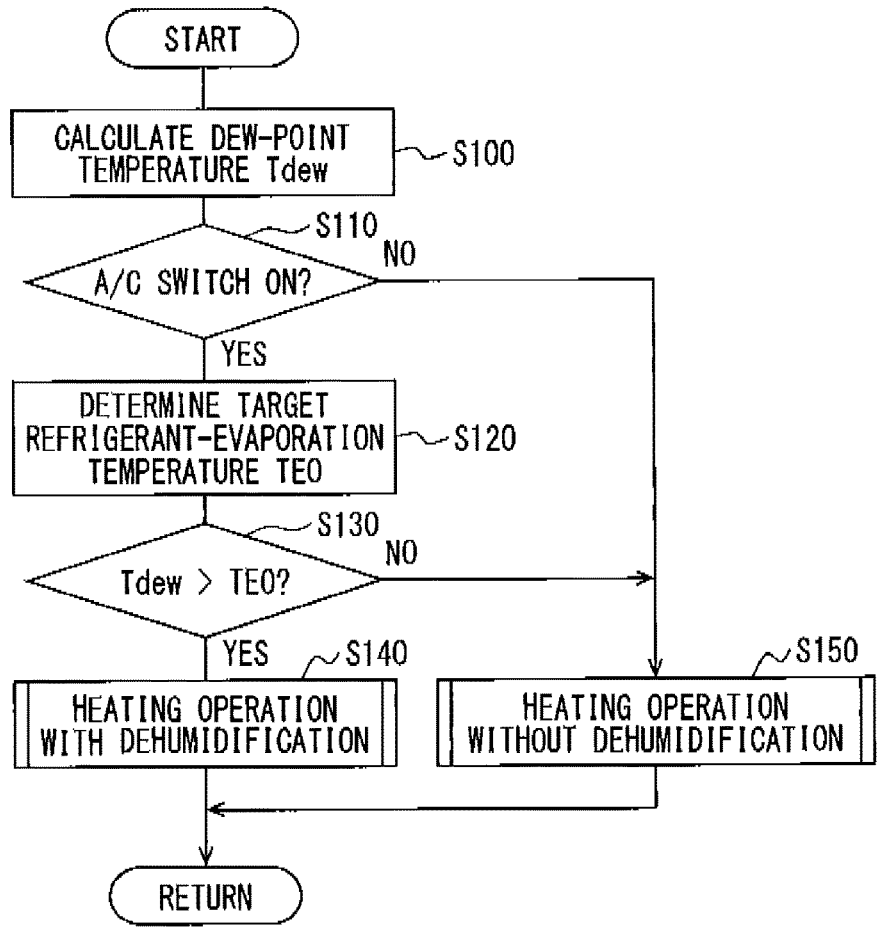
FIG. 4 is a flowchart showing the flow of a part of the control process performed by the air conditioning controller in the first embodiment.

The control process for determining either the dehumidification heating operation mode or the normal heating operation mode without dehumidifying the air in step S10 will be described below with reference to FIG. 4. FIG. 4 is a flowchart showing the flow of a part (sub-routine) of the control process performed by the air conditioning controller 40 in this embodiment.

In step S100, first, the dew-point temperature Tdew of the air flowing into the interior evaporator 17 is calculated using a detection signal from the temperature and humidity sensor 42 read in step S3, that is, using the temperature and humidity of the air flowing into the interior evaporator 17, and then the operation proceeds to step S110.

In step S110, it is determined whether or not the A/C switch is turned on based on the operation signal of the operation panel read in step S3. As a result, when the A/C switch is determined to be turned on (if YES in step S110), the operation proceeds to step S120, in which a target refrigerant-evaporation temperature TEO of the interior evaporator 17 is determined, and then the operation proceeds to step S130.

When the outside air temperature Tam is decreased, a window of the vehicle, such as a front windowpane, is likely to be easily fogged. In order to prevent the fogging of the window, it is necessary to decrease the refrigerant evaporation temperature of the interior evaporator 17. In this case, the amount of heat generated in the interior evaporator 17 is increased, which leads to an increase in dehumidification load.

Thus, in step S120, the target refrigerant-evaporation temperature TEO in the heating operation mode is determined with reference to the control map (control characteristics) pre-stored in the air conditioning controller 40 based on the detection signal (outside air temperature) from the outside air sensor read in step S3. Basically, in this embodiment, the target refrigerant-evaporation temperature TEO is determined to be decreased with decreasing outside air temperature. In this embodiment, the process of step S120 performed by the air conditioning controller 40 serves as an evaporator temperature determination portion for determining the target refrigerant-evaporation temperature TEO.

Figure 5:
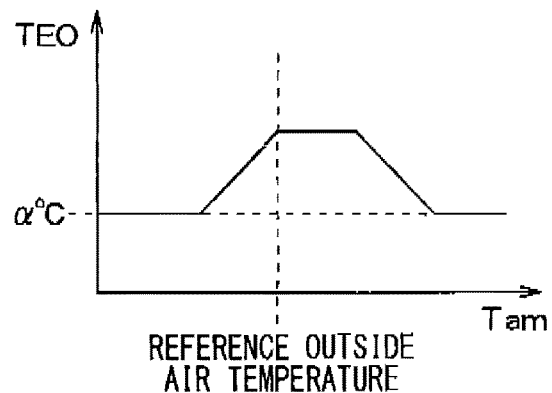
FIG. 5 is a control characteristic diagram defining the relationship between an outside air temperature and a target refrigerant-evaporation temperature in the first embodiment.
Figure 6:
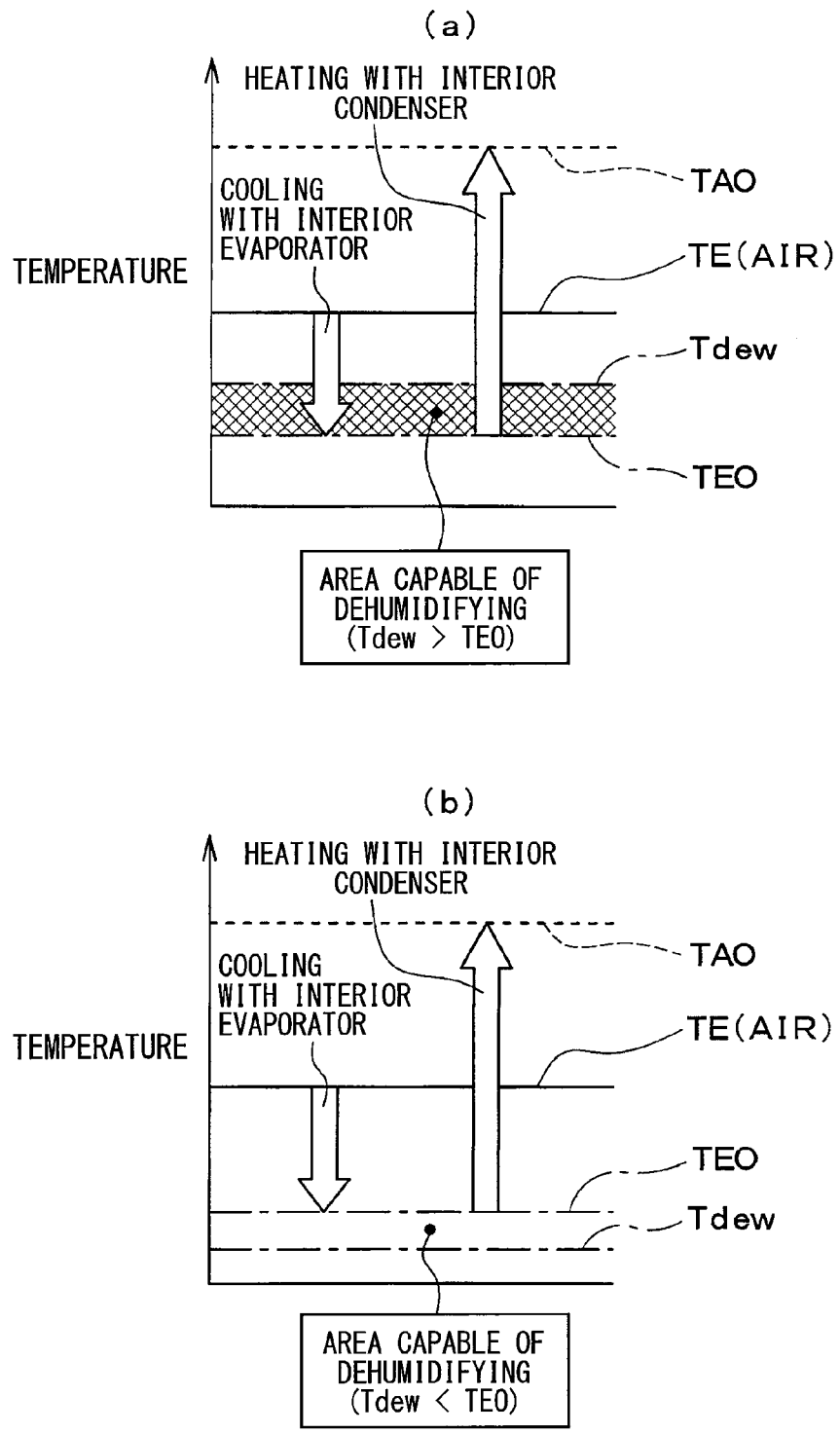
FIGS. 6($a$) and 6($b$) are explanatory diagrams for explaining the possibility of dehumidification of air in an interior evaporator.

FIG. 5 is a control characteristic diagram defining the relationship between the outside air temperature Tam and the target refrigerant-evaporation temperature TEO in this embodiment. As shown in FIG. 5, in this embodiment, when the outside air temperature Tam is decreased to a predetermined reference outside air temperature or less, that is, from the intermediate temperature range to the low temperature range, the target refrigerant-evaporation temperature TEO is determined to be decreased according to a decrease in outside air temperature Tam. When the outside air temperature Tam is in the ultra-low temperature range, in order to prevent the frost formation of the interior evaporator 17, the target refrigerant-evaporation temperature TEO is determined to be the minimum temperature α (1° C. in this embodiment) which is set at a frost formation temperature (0° C.) or more.

In contrast, in this embodiment, when the outside air temperature Tam is higher than the reference outside air temperature, the target refrigerant-evaporation temperature TEO is determined to be maximum in the intermediate temperature range. When the outside air temperature is increased from the intermediate temperature range to the high temperature range, the target refrigerant-evaporation temperature TEO is determined to be decreased according to an increase in outside air temperature Tam. When selecting the heating operation mode, the outside air temperature Tam is low in many cases. Basically, in the heating operation mode, the outside air temperature Tam in the control map of FIG. 5 is referred to the range of the reference outside air temperature or less.

Subsequently, in step S130, the possibility of dehumidification of the air by the interior evaporator 17 is determined based on the dew-point temperature Tdew calculated in step S110 and the target refrigerant-evaporation temperature TEO determined in step S120. Specifically, in step S130, it is determined whether the dew-point temperature Tdew is higher than the target refrigerant-evaporation temperature TEO as a reference threshold. In this embodiment, the process in step S130 performed by the air conditioning controller 40 serves as a determination portion for determining whether or not the dew-point temperature Tdew of the air flowing into the interior evaporator 17 is equal to or less than the reference threshold.

FIGS. 6(a) and 6(b) are an explanatory diagram for explaining the possibility of dehumidification of air in the interior evaporator 17. When the dew-point temperature Tdew is higher than the target refrigerant-evaporation temperature TEO, as shown in FIG. 6(a), the air flowing into the interior evaporator 17 is dehumidified and cooled close to the target refrigerant-evaporation temperature TEO which is not higher than the dew-point temperature Tdew, and then heated to a desired temperature by the interior condenser 12.

Referring to FIGS. 6(a), 6(b), the reference character TE(AIR) means the temperature of air on an inlet side of the interior evaporator 17.

When the dew-point temperature Tdew is equal to or lower than the target refrigerant-evaporation temperature TEO, as shown in FIG. 6(b), the air flowing into the interior evaporator 17 is cooled close to the target refrigerant-evaporation temperature TEO which is higher than the dew-point temperature Tdew, and then heated to a desired temperature by the interior condenser 12. That is, when the dew-point temperature Tdew is equal to or less than the target refrigerant-evaporation temperature TEO, the air cannot be dehumidified by the interior evaporator 17, and is simply cooled by the interior evaporator 17, which might waste the energy of the vehicle air conditioner 1.

Thus, when the dew-point temperature Tdew is determined to be higher than the target refrigerant-evaporation temperature TEO in step S130 (if YES in step S130), the operation proceeds to step S140, in which the control process for the dehumidification heating operation mode (heating operation mode with the dehumidification) is performed. The control process for the dehumidification heating operation mode will be described in detail later.

When the dew-point temperature Tdew is determined to be equal to or less than the target refrigerant-evaporation temperature TEO in step S130 (if NO in step S130), the operation proceeds to step S150, in which the control process for the normal heating operation mode (heating operation mode without the dehumidification) is performed.

When the A/C switch is determined to be turned off in step S110 (if NO in step S110), the operation proceeds to step S150, in which the control process for the normal heating operation mode not allowing the refrigerant to flow into the interior evaporator 17 (heating operation mode without the dehumidification) is performed.

Returning to FIG. 3, after the operation mode is determined in steps S9 and S10, the operation proceeds to step S11, in which the control signal and control voltage are output to various control devices connected to the output side of the air conditioning controller 40 so as to obtain the control state determined in the above steps S5 to S10.

As mentioned above, the main routine shown in FIG. 3 involves reading various signals, calculating the target air outlet temperature TAO, determining the control states of various control devices, and outputting the control signal and voltage to the respective control devices, in that order.

Next, the processes in the respective operation modes performed in steps S9, S140, and S150 will be described in detail.

(A) Cooling Operation Mode

Figure 7:
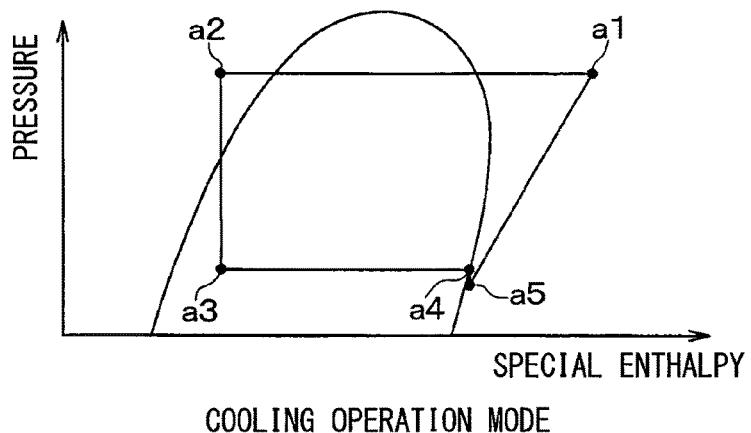
FIG. 7 is a Mollier chart showing the state of refrigerant in the cooling operation mode of the refrigeration cycle in the first embodiment.

First, the cooling operation mode performed in step S9 shown in FIG. 3 will be described below with reference to FIG. 7. FIG. 7 is a Mollier chart showing the state of refrigerant in the cooling operation mode of the refrigeration cycle 10 in this embodiment.

In the cooling operation mode, the air conditioning controller 40 closes the bypass passage opening/closing valve 20, while fully opening the first expansion valve 13, and brings the second expansion valve 16 into the throttle state exhibiting a decompression effect.

Thus, when the control signal and control voltage are output to the respective control devices in step S11 of FIG. 3, the refrigeration cycle 10 performs switching to the refrigerant circuit for flowing the refrigerant as indicated by the thick arrow of FIG. 1. With the above arrangement of the refrigerant circuit, the operating states of the respective air conditioning control devices of interest connected to the output side of the air conditioning controller 40 are determined based on the target air outlet temperature TAO calculated in step S4 of FIG. 3 and the detection signal from the sensor group 41.

For example, the refrigerant discharge capacity of the compressor 11, that is, the control signal to be output to the inverter 51 for controlling the electric motor of the compressor 11 are determined in the following way. First, the target refrigerant-evaporation temperature TEO of the interior evaporator 17 is determined based on the target air outlet temperature TAO with reference to the control map pre-stored in the air conditioning controller 40. The target refrigerant-evaporation temperature TEO is determined to be a predetermined temperature (1° C. in this embodiment) or more which is higher than the frost formation temperature (0° C.) in order to prevent the frost formation at the interior evaporator 17.

Then, a refrigerant discharge capacity of the compressor 11 is determined based on a deviation between the target refrigerant-evaporation temperature TEO and the refrigerant evaporation temperature of the interior evaporator 17 detected by the evaporator temperature sensor such that the evaporation temperature of the refrigerant from the interior evaporator 17 approaches the target refrigerant-evaporation temperature TEO by a feedback control method.

The control signal to be output to the second expansion valve 16 is determined such that the super-cooling degree of the refrigerant flowing into the second expansion valve 16 approaches a target super-cooling degree previously determined so as to bring a COP substantially closer to the maximum value. The control signal to be output to the servo motor of the air mix door 34 is determined such that the air mix door 34 closes an air passage of the interior condenser 12, and that the whole volume of air having passed through the interior evaporator 17 can pass through the cool air bypass passage 35.

Thus, as shown in the Mollier chart shown in FIG. 7, in the refrigeration cycle 10 in the cooling operation mode, the high-pressure refrigerant discharged from the compressor 11 (as indicated by a point "a1" in FIG. 7) flows into the interior condenser 12. At this time, the air mix door 34 closes an air passage of the interior condenser 12, so that the refrigerant entering the interior condenser 12 flows from the interior condenser 12 without exchanging heat with the air.

The refrigerant flowing from the interior condenser 12 flows into the first expansion valve 13. At this time, the first expansion valve 13 is fully opened, so that the refrigerant flowing from the interior condenser 12 flows into the exterior heat exchanger 14 without being decompressed by the first expansion valve 13. The refrigerant flowing into the exterior heat exchanger 14 dissipates heat into the outside air blown from the blower fan 15 at the exterior heat exchanger 14 (from the point "a1" to a point "a2" in FIG. 7).

The refrigerant flowing from the exterior heat exchanger 14 flows into the second expansion valve 16, and is decompressed and expanded by the second expansion valve 16 into a low-pressure refrigerant (from the point "a2" to a point "a3 in FIG. 7). The low-pressure refrigerant decompressed by the second expansion valve 16 flows into the interior evaporator 17, and absorbs heat from the air blown from the blower 32 to evaporate itself. Thus, the air is cooled (from the point "a3" to a point "a4" in FIG. 7).

The refrigerant flowing from the interior evaporator 17 flows into the accumulator 18, and is then separated into liquid and gas phases by the accumulator 18. The gas-phase refrigerant separated into by the accumulator 18 is sucked into the suction side of the compressor 11 (at a point "a5" of FIG. 7) and compressed by the compressor 11 again (from the point "a5" to the point "a1" of FIG. 7). The liquid-phase refrigerant separated into by the accumulator 18 is stored in the accumulator 18 as an excessive refrigerant not required for the cycle to exhibit the refrigeration capacity.

The reason for a difference between the point "a4" and the point "a5" in FIG. 7 is that the gas-phase refrigerant flowing through a refrigerant pipe leading from the accumulator 18 to the suction side of the compressor 11 has a loss of pressure. Thus, in an ideal cycle, the point "a4" is desirably identical to the point "a5". The same goes for the Mollier chart below.

As mentioned above, in the cooling operation mode, an air passage of the interior condenser 12 is closed by the air mix door 34, so that the air cooled by the interior evaporator 17 can be blown into the vehicle interior. Thus, the cooling of the vehicle interior can be achieved.

(B) Normal Heating Operation Mode (Heating Operation without Dehumidification)

Figure 8:
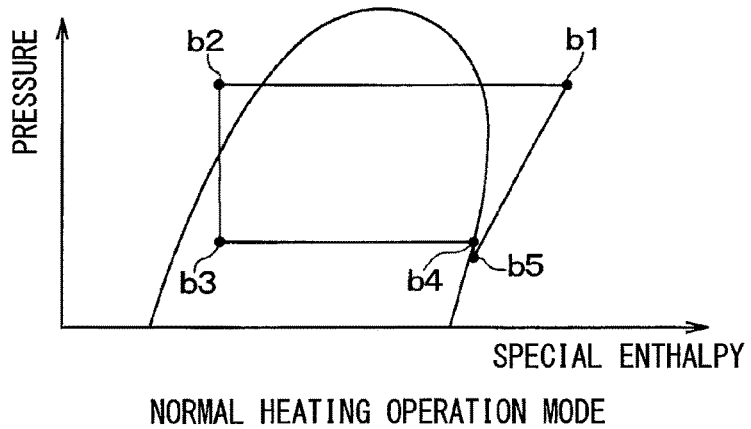
FIG. 8 is another Mollier chart showing the state of refrigerant in a normal heating operation mode of the refrigeration cycle in the first embodiment.

Next, the normal heating operation mode performed in step S150 will be described below with reference to FIG. 8. FIG. 8 is a Mollier chart showing the state of refrigerant in the normal heating operation mode of the refrigeration cycle 10 in this embodiment.

In the normal heating operation mode, the air conditioning controller 40 opens the bypass passage opening/closing valve 20, while bringing the first expansion valve 13 into the throttle state exhibiting a decompression effect, and closes the second expansion valve 16.

Thus, when the control signal and control voltage are output to the respective control devices in step S11 of FIG. 3, the refrigeration cycle 10 performs switching to the refrigerant circuit for flowing the refrigerant as indicated by the thick arrow of FIG. 2. With the above arrangement of the refrigerant circuit, the operating states of the respective air conditioning control devices connected to the output side of the air conditioning controller 40 are determined based on the target air outlet temperature TAO calculated in step S4 of FIG. 3 and the detection signal from the sensor group 41.

For example, the refrigerant discharge capacity of the compressor 11 is determined in the following way. First, a target condenser temperature TCO of the interior condenser 12 is determined based on the target air outlet temperature TAO with reference to the control map pre-stored in the air conditioning controller 40.

Then, the refrigerant discharge capacity of the compressor 11 is determined such that the temperature of air passing through the interior condenser 12 approaches the target air outlet temperature TAO using the feedback control method based on the deviation between the target condenser temperature TCO and the detection value from the discharge temperature sensor.

The control signal output to the first expansion valve 13 is determined such that the super-cooling degree of the refrigerant flowing into the first expansion valve 13 approaches a target super-cooling degree previously determined so as to bring a COP closer to the maximum value.

The control signal output to the servo motor of the air mix door 34 is determined such that the air mix door 34 closes the cool air bypass passage 35, and that the whole volume of air having passed through the interior evaporator 17 can pass through the air passage of the interior condenser 12.

Thus, in the normal heating operation mode of the refrigeration cycle 10, the high-pressure refrigerant discharged from the compressor 11 (as indicated by a point "b1" in FIG. 8) flows into the interior condenser 12. The refrigerant flowing into the interior condenser 12 exchanges heat with the air blown from the blower 32 and passing through the interior evaporator 17 to thereby dissipate heat therefrom (from the point "b1" to a point "b2" in FIG. 8). Thus, the air is heated.

The refrigerant flowing from the interior condenser 12 flows into the first expansion valve 13, and then decompressed and expanded by the first expansion valve 13 into a low-pressure refrigerant (from the point "b2" to a point "b3" in FIG. 8). The low-pressure refrigerant decompressed by the first expansion valve 13 flows into the exterior heat exchanger 14, and absorbs heat from the outside air blown from the blower fan 15 (from the point "b3" to a point "b4" in FIG. 8). The refrigerant flowing from the exterior heat exchanger 14 flows into the accumulator 18 via the bypass passage 19 to be separated into liquid and gas phases. The gas-phase refrigerant separated into by the accumulator 18 is sucked into the suction side of the compressor 11 (at a point "b5" of FIG. 8) and compressed by the compressor 11 again.

As mentioned above, in the heating operation mode, the heat contained in the high-pressure refrigerant discharged from the compressor 11 is dissipated into the air in the interior condenser 12, so that the heated air can be blown into the vehicle interior. Thus, the heating of the vehicle interior can be performed. In the normal heating operation mode, the bypass passage opening/closing valve 20 is opened and the second expansion valve 16 is completely closed, which does not allow the refrigerant to flow into the interior evaporator 17. Thus, the air blown from the blower 32 flows into the interior condenser 12 without being cooled by the interior evaporator 17.

(C) Dehumidification Heating Operation Mode (Heating Operation with Dehumidification)

Next, the dehumidification heating operation mode performed in step S140 will be described below with reference to FIGS. 8 to 11. In the dehumidification heating operation mode, the air conditioning controller 40 closes the bypass passage opening/closing valve 20, while bringing the first and second expansion valves 13 and 16 into the throttle state, or fully opened state. Thus, the refrigeration cycle 10 performs switching to the refrigerant circuit in which the refrigerant flows as indicated by the thick arrow of FIG. 1, like in the cooling operation mode. In the dehumidification heating operation mode, the exterior heat exchanger 14 and the interior evaporator 17 are connected in series with respect to the refrigerant flow.

With the above arrangement of the refrigerant circuit, the air conditioning controller 40 determines the operating state of various air conditioning control devices (control signal output to the various air conditioning control devices) connected to the output side of the air conditioning controller 40 based on the target air outlet temperature TAO and detection signals from the sensor group.

For example, the refrigerant discharge capacity of the compressor 11 is determined in the following way. Then, a refrigerant discharge capacity of the compressor 11 is determined based on a deviation between the target evaporator outlet temperature TEO determined in step S120 of FIG. 4 and the refrigerant evaporation temperature of the interior evaporator 17 detected by the evaporator temperature sensor such that the refrigerant evaporation temperature of the interior evaporator 17 approaches the target refrigerant-evaporation temperature TEO by a feedback control method.

The control signal output to the servo motor of the air mix door 34 is determined such that the air mix door 34 closes the cool air bypass passage 35, and that the whole volume of air having passed through the interior evaporator 17 can pass through the air passage of the interior condenser 12.

The first expansion valve 13 and the second expansion valve 16 are changed according to the target air outlet temperature TAO which is the target temperature of the air blown into the vehicle interior. Specifically, the air conditioning controller 40 increases a decrease in pressure of the first expansion valve 13, while decreasing a decrease in pressure of the second expansion valve 16 with increasing target air outlet temperature TAO. Thus, in the dehumidification heating operation mode of this embodiment, the first to fourth dehumidification heating modes are performed in fourth stages.

(C-1) First Dehumidification Heating Mode

Figure 9:
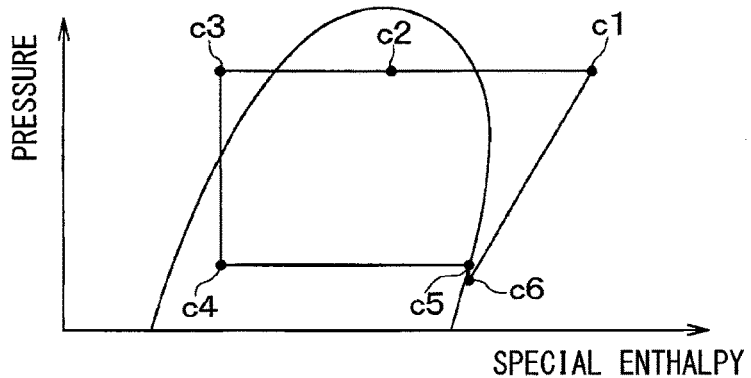
FIG. 9 is another Mollier chart showing the state of refrigerant in a first dehumidification heating mode of the refrigeration cycle in the first embodiment.

First, a first dehumidification heating mode will be described below using FIG. 9. FIG. 9 is another Mollier chart showing the state of refrigerant in the first dehumidification heating mode of the refrigeration cycle 10 in this embodiment.

In the first dehumidification heating mode, the first expansion valve 13 is completely opened, and the second expansion valve 16 is brought into the throttle state. Thus, the cycle structure (refrigerant circuits) has the same refrigerant circuit as that in the cooling operation mode, but the air mix door 34 fully opens the air passage on the interior condenser 12 side, so that the state of the refrigerant circulating through the cycle changes as indicated by the Mollier chart of FIG. 9.

That is, as shown in FIG. 9, the high-pressure refrigerant (as indicated by a point "c1") discharged from the compressor 11 flows into the interior condenser 12 to exchange heat with the air cooled and dehumidified by the interior evaporator 17, thereby dissipating heat therefrom (from the point "c1" to a point "c2" in FIG. 9). Thus, the air is heated.

The refrigerant flowing from the interior condenser 12 flows into the first expansion valve 13. At this time, the first expansion valve 13 is fully opened, so that the refrigerant flowing from the interior condenser 12 flows into the exterior heat exchanger 14 without being decompressed by the first expansion valve 13. The refrigerant flowing into the exterior heat exchanger 14 dissipates heat at the exchanger 14 into the outside air blown from the blower fan 15 (from the point "c2" to a point "c3" in FIG. 9).

The refrigerant flowing from the exterior heat exchanger 14 flows into the second expansion valve 16, and is decompressed and expanded by the second expansion valve 16 into a low-pressure refrigerant (from the point "c3" to a point "c4" in FIG. 9). The low-pressure refrigerant decompressed by the second expansion valve 16 flows into the interior evaporator 17, and absorbs heat from the air blown from the blower 32 to evaporate itself (from the point "c4" to a point "c5" in FIG. 9). Thus, the air is dehumidified and cooled. The refrigerant flowing from the interior evaporator 17 flows from the accumulator 18 to the suction side of the compressor 11 (at a point "c6" of FIG. 9), and then is compressed again by the compressor 11, like in the cooling operation mode (from the point "c6" to the point "c1" in FIG. 9).

As mentioned above, in the first dehumidification heating mode, the air cooled and dehumidified by the interior evaporator 17 can be heated by the interior condenser 12 to be blown into the vehicle interior. Thus, the dehumidification and heating of the vehicle interior can be achieved.

(C-2) Second Dehumidification Heating Mode

Figure 10:
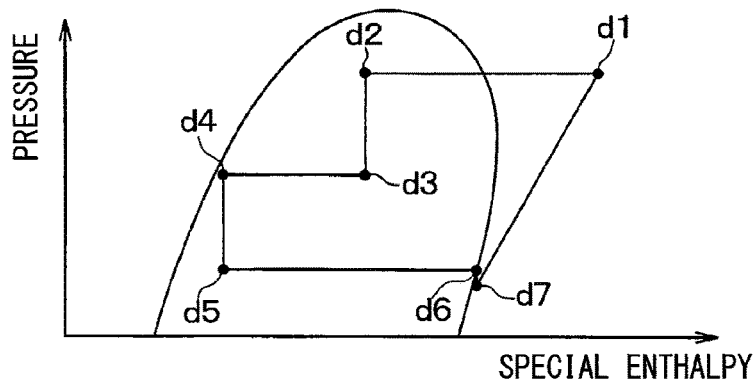
FIG. 10 is another Mollier chart showing the state of refrigerant in a second dehumidification heating mode of the refrigeration cycle in the first embodiment.

Subsequently, a second dehumidification heating mode will be described below using FIG. 10. FIG. 10 is another Mollier chart showing the state of refrigerant in the second dehumidification heating mode of the refrigeration cycle 10 in this embodiment.

The second dehumidification heating mode is performed when the target air outlet temperature TAO is higher than a first reference temperature, and equal to or less than a second reference temperature previously determined. In the second dehumidification heating mode, the first expansion valve 13 is brought into the throttle state, and the second expansion valve 16 is also brought into the throttle state while a throttle opening degree of the second expansion valve 16 is increased as compared to that in the first dehumidification heating mode. Thus, in the second dehumidification heating mode, the state of the refrigerant circulating through the cycle is changed as indicated by the Mollier chart of FIG. 10.

That is, as shown in FIG. 10, the high-pressure refrigerant (as indicated by a point "d1") discharged from the compressor 11 flows into the interior condenser 12 to exchange heat with the air cooled and dehumidified by the interior evaporator 17, thereby dissipating heat therefrom (from the point "d1" to a point "d2" in FIG. 10). Thus, the air is heated.

The refrigerant flowing from the interior condenser 12 flows into the first expansion valve 13, and then decompressed by the first expansion valve 13 into an intermediate-pressure refrigerant (from the point "d2" to a point "d3" in FIG. 10). Then, the intermediate-pressure refrigerant decompressed by the first expansion valve 13 flows into the exterior heat exchanger 14, and dissipates heat into the outside air blown from the blower fan 15 (from the point "d3" to a point "d4" in FIG. 10).

The refrigerant flowing from the exterior heat exchanger 14 flows into the second expansion valve 16, and is decompressed and expanded by the second expansion valve 16 into a low-pressure refrigerant (from the point "d4" to a point "d5" in FIG. 10). The low-pressure refrigerant decompressed by the second expansion valve 16 flows into the interior evaporator 17, and absorbs heat from the air blown from the blower 32 to evaporate itself (from the point "d5" to a point "d6" in FIG. 10). Thus, the air is dehumidified and cooled. Then, the refrigerant flowing from the interior evaporator 17 flows from the accumulator 18 to the suction side of the compressor 11 (at a point "d7" of FIG. 10), and then is compressed again by the compressor 11, like in the cooling operation mode (from the point "d7" to the point "d1" in FIG. 10).

As mentioned above, in the second dehumidification heating mode, the air cooled and dehumidified by the interior evaporator 17 can be heated by the interior condenser 12 to be blown into the vehicle interior, like in the first dehumidification heating mode. Thus, the dehumidification and heating of the vehicle interior can be achieved.

At this time, in the second dehumidification heating mode, the first expansion valve 13 is in the throttle state, so that the temperature of the refrigerant flowing into the exterior heat exchanger 14 can be decreased as compared to in the first dehumidification heating mode. Thus, the amount of heat dissipated from the refrigerant at the exterior heat exchanger 14 can be reduced by decreasing a difference between the outside air temperature Tam and the temperature of refrigerant in the exterior heat exchanger 14.

As a result, the amount of heat dissipated from the refrigerant in the interior condenser 12 can be increased, which can increase the temperature of the air blown from the interior condenser 12 as compared to in the first mode.

(C-3) Third Dehumidification Heating Mode

Figure 11:
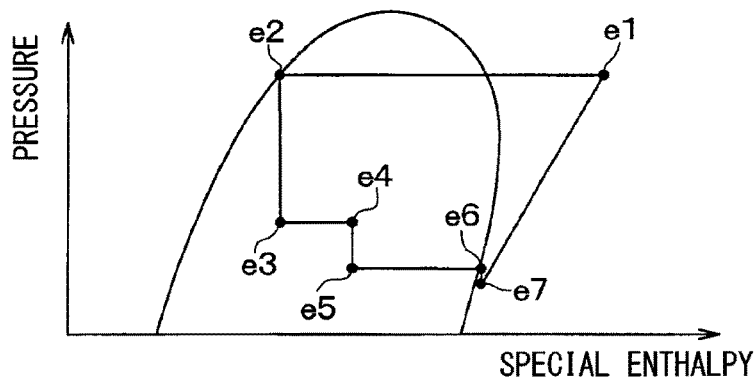
FIG. 11 is another Mollier chart showing the state of refrigerant in a third dehumidification heating mode of the refrigeration cycle in the first embodiment.

Subsequently, a third dehumidification heating mode will be described below using FIG. 11. FIG. 11 is another Mollier chart showing the state of refrigerant in the third dehumidification heating mode of the refrigeration cycle 10 in this embodiment.

The third dehumidification heating mode is performed when the target air outlet temperature TAO is higher than a second reference temperature, and equal to or less than a third reference temperature previously determined. In the third dehumidification heating mode, the first expansion valve 13 is in the throttle state while a throttle opening degree of the first expansion valve 13 is decreased as compared to that in the second dehumidification heating mode, and the second expansion valve 16 is in the throttle state in which a throttle opening degree of the second expansion valve 16 is increased as compared to that in the second dehumidification heating mode. Thus, in the third dehumidification heating mode, the state of the refrigerant circulating through the cycle is changed as indicated by the Mollier chart of FIG. 11.

That is, as shown in FIG. 11, the high-pressure refrigerant (as indicated by a point "e1" of FIG. 11) discharged from the compressor 11 flows into the interior condenser 12 to exchange heat with the air cooled and dehumidified by the interior evaporator 17, thereby dissipating heat therefrom (from the point "e1" to a point "e2" in FIG. 11). Thus, the air is heated.

The refrigerant flowing from the interior condenser 12 flows into the first expansion valve 13, and is then decompressed by the first expansion valve 13 into an intermediate-pressure refrigerant whose temperature is lower than the outside air temperature (from the point "e2" to a point "e3" in FIG. 11). Then, the intermediate-pressure refrigerant decompressed by the first expansion valve 13 flows into the exterior heat exchanger 14, and absorbs heat from the outside air blown from the blower fan 15 (from the point "e3" to a point "e4" in FIG. 11).

The refrigerant flowing from the exterior heat exchanger 14 flows into the second expansion valve 16, and is decompressed and expanded by the second expansion valve 16 into a low-pressure refrigerant (from the point "e4" to a point "e5" in FIG. 11). The low-pressure refrigerant decompressed by the second expansion valve 16 flows into the interior evaporator 17, and absorbs heat from the air blown from the blower 32 to evaporate itself (from the point "e5" to a point "e6" in FIG. 11). Thus, the air is dehumidified and cooled. Then, the refrigerant flowing from the interior evaporator 17 flows from the accumulator 18 to the suction side of the compressor 11 (at a point "e7" of FIG. 11), and then is compressed again by the compressor 11, like in the cooling operation mode (from the point "e7" to the point "e1" in FIG. 11).

As mentioned above, in the third dehumidification heating mode, like the first and second dehumidification heating modes, the air cooled and dehumidified by the interior evaporator 17 can be heated by the interior condenser 12 to be blown into the vehicle interior. Thus, the dehumidification and heating of the vehicle interior can be achieved.

At this time, in the third dehumidification heating mode, the throttle opening degree of the first expansion valve 13 is decreased, so that the exterior heat exchanger 14 can serve as an absorber (evaporator). As a result, the amount of heat dissipated from the refrigerant in the interior condenser 12 can be increased, which can increase the temperature of the air blown from the interior condenser 12 as compared to in the second dehumidification heating mode.

(C-4) Fourth Dehumidification Heating Mode

Figure 12:
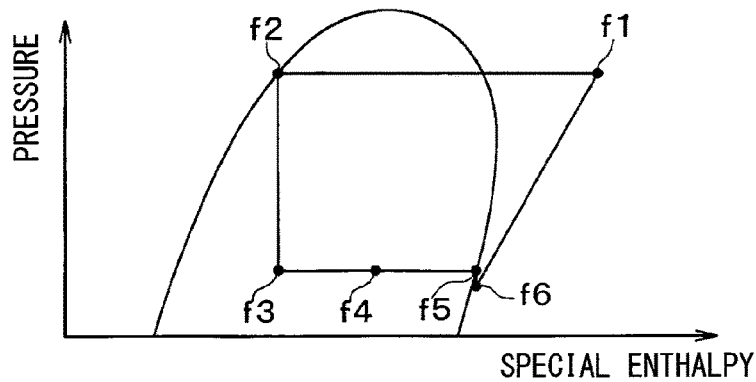
FIG. 12 is another Mollier chart showing the state of refrigerant in a fourth dehumidification heating mode of the refrigeration cycle in the first embodiment.

Subsequently, a fourth dehumidification heating mode will be described below using FIG. 12. FIG. 12 is another Mollier chart showing the state of refrigerant in the fourth dehumidification heating mode of the refrigeration cycle 10 in this embodiment.

The fourth dehumidification heating mode is performed when the target air outlet temperature TAO is higher than a third reference temperature. In the fourth dehumidification heating mode, the first expansion valve 13 is in the throttle state while a throttle opening degree of the first expansion valve 13 is decreased as compared to that in the third dehumidification heating mode, and the second expansion valve 16 is fully opened. Thus, in the fourth dehumidification heating mode, the state of the refrigerant circulating through the cycle is changed as indicated by the Mollier chart of FIG. 12.

That is, as shown in FIG. 12, the high-pressure refrigerant (as indicated by a point "f1") discharged from the compressor 11 flows into the interior condenser 12 to exchange heat with the air cooled and dehumidified by the interior evaporator 17, thereby dissipating heat therefrom (from the point "f1" to a point "f2" in FIG. 12). Thus, the air is heated.

The refrigerant flowing from the interior condenser 12 flows into the first expansion valve 13, and is then decompressed by the first expansion valve 13 into a low-pressure refrigerant (from the point "f2" to a point "f3" in FIG. 12). The low-pressure refrigerant decompressed by the first expansion valve 13 flows into the exterior heat exchanger 14, and absorbs heat from the outside air blown from the blower fan 15 (from the point "f3" to a point "f4" in FIG. 12).

The refrigerant flowing from the exterior heat exchanger 14 flows into the second expansion valve 16. At this time, the second expansion valve 16 is fully opened, so that the refrigerant flowing from the exterior heat exchanger 14 flows into the exterior evaporator 17 without being decompressed by the second expansion valve 16.

The low-pressure refrigerant flowing into the interior evaporator 17 absorbs heat from the air blown from the blower 32 to evaporate itself (from the point "f4" to a point "f5" in FIG. 12). Thus, the air is dehumidified and cooled. The refrigerant flowing from the interior evaporator 17 flows from the accumulator 18 to the suction side of the compressor (at a point "f6" of FIG. 12), and then is compressed again by the compressor 11, like in the cooling operation mode (from the point "f6" to the point "f1" in FIG. 12).

As mentioned above, in the fourth dehumidification heating mode, like the first to third dehumidification heating modes, the air cooled and dehumidified by the interior evaporator 17 can be heated by the interior condenser 12 to be blown into the vehicle interior. Thus, the dehumidification and heating of the vehicle interior can be achieved.

At this time, in the fourth dehumidification heating mode, the exterior heat exchanger 14 can serve as a heat absorber (evaporator), like the third dehumidification heating mode. In the fourth dehumidification heating mode, a throttle opening degree of the first expansion valve 13 is decreased to a smaller value than that in the third dehumidification heating mode, so that the temperature of the refrigerant flowing into the exterior heat exchanger 14 can be decreased as compared to in the third dehumidification heating mode. Thus, a difference between the refrigerant temperature and the outside air temperature in the exterior heat exchanger 14 can be enlarged to increase the amount of heat absorbed in the refrigerant by the exterior heat exchanger 14.

As a result, the amount of heat dissipated from the refrigerant in the interior condenser 12 can be increased, which can increase the temperature of the air blown from the interior condenser 12 as compared to in the third dehumidification heating mode.

Thus, in the dehumidification heating operation mode, the throttle opening degrees of the first expansion valve 13 and the second expansion valve 16 are changed according to the target air outlet temperature TAO, so that the temperature of the air blown into the vehicle interior can be adjusted in a wide range from a low-temperature range to a high-temperature range.

In this embodiment described above, when the refrigerant evaporation temperature of the interior evaporator 17 cannot be set lower than the dew-point temperature Tdew of the air flowing into the interior evaporator 17 in performing the heating operation, the switching is performed to a refrigerant circuit for the normal heating operation mode that sets the flow rate of the refrigerant into the interior evaporator 17 to zero by allowing the refrigerant to flow toward the bypass passage 19 side.

When the air cannot be dehumidified by the interior evaporator 17, the unnecessary heat exchange between the air and the refrigerant in the interior evaporator 17 can be suppressed. Thus, the waste of the energy at the vehicle air conditioner 1 can be effectively prevented.

In this embodiment, the target refrigerant-evaporation temperature TEO of the interior evaporator 17 is determined according to the outside air temperature Tam which is a physical quantity in correlation with a dehumidification load of the vehicle interior. When the refrigerant evaporation temperature at the interior evaporator 17 can be set lower than the dew-point temperature Tdew of the air flowing into the interior evaporator 17, the air to be blown into the vehicle interior can be appropriately dehumidified by the interior evaporator 17.

Second Embodiment

Figure 13:
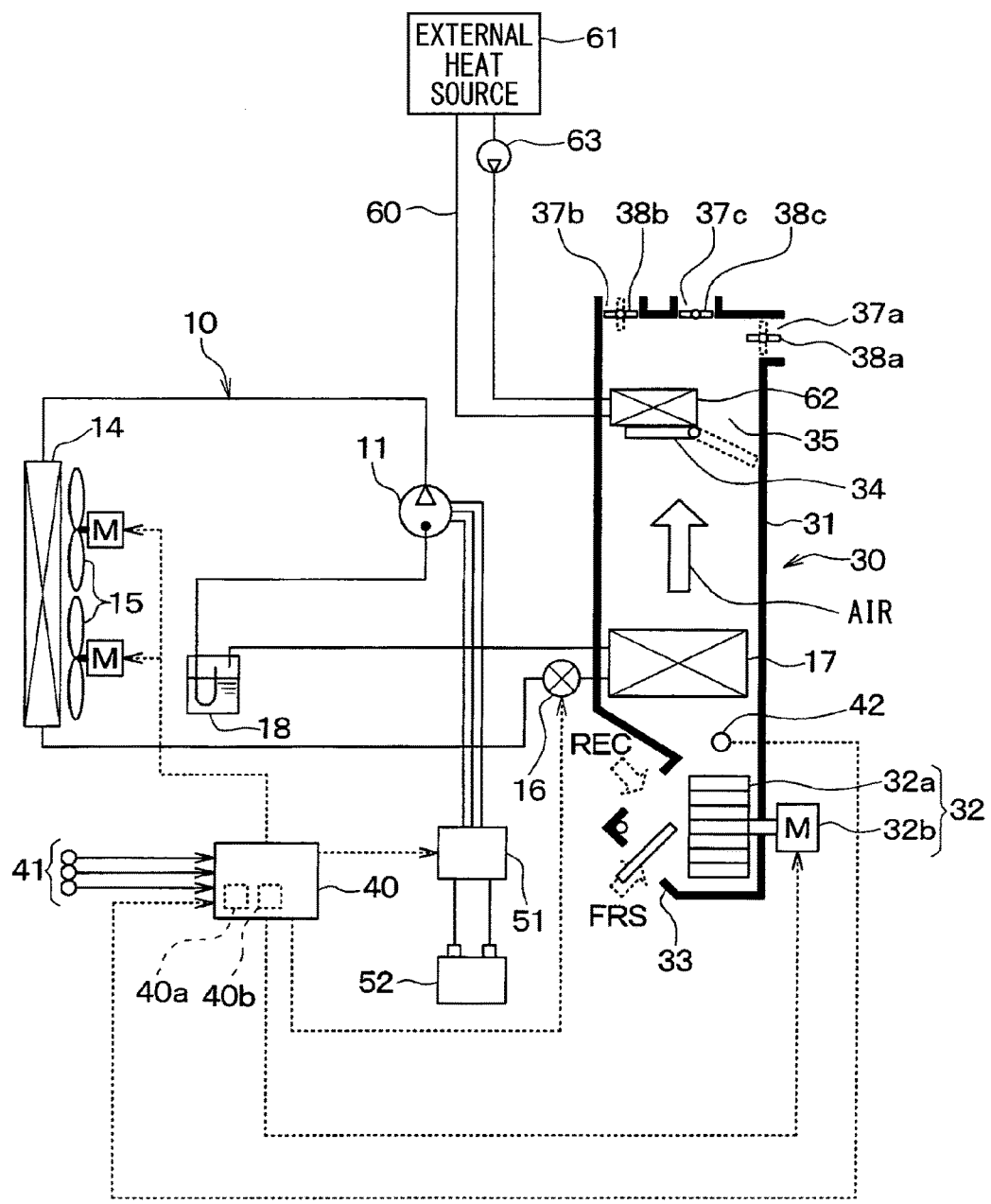
FIG. 13 is an entire configuration diagram of a vehicle air conditioner according to a second embodiment of the present disclosure.

A second embodiment of the present disclosure will be described with reference to FIG. 13. As shown in the entire configuration diagram of FIG. 13, the structures of the refrigeration cycle 10 and the interior air conditioning unit 30 in this embodiment are changed as compared to those in the first embodiment, which will be described below. FIG. 13 shows an entire configuration diagram of the vehicle air conditioner 1 in this embodiment.

First, the refrigeration cycle 10 of the second embodiment will be described below. The refrigeration cycle 10 of this embodiment abolishes the use of the interior condenser 12, the first expansion valve 13, the bypass passage 19, and the bypass passage opening/closing valve 20 of the first embodiment.

Specifically, in the refrigeration cycle 10 of this embodiment, the discharge port side of the compressor 11 is coupled to the inlet side of the exterior heat exchanger 14, while the outlet side of the exterior heat exchanger 14 is coupled to the inlet side of the second expansion valve 16. Further, the outlet side of the second expansion valve 16 is coupled to the interior evaporator 17, while the outlet side of the interior evaporator 17 is coupled to the suction side of the compressor 11 via the accumulator 18.

Subsequently, the interior air conditioning unit 30 will be described below. In the interior air conditioning unit 30 of this embodiment, a heater core 62 is disposed within the casing 31 in place of the interior condenser 12 of the first embodiment, that is, on the downstream side of the air flow of the interior evaporator 17.

The heater core 62 is a heating device for heating air having passed through the interior evaporator 17 by exchanging heat between the air having passed through the interior evaporator 17 and an engine coolant for cooling an engine (internal combustion engine) 61 serving as an external heat source. The heater core 62 is coupled to a coolant circulation circuit 60 through which the engine coolant circulates. The heater core 62 is configured to allow the engine coolant to flow by an operation of a coolant pump 63 provided in the coolant circulation circuit 60.

Next, the operation of the vehicle air conditioner 1 with the above arrangement in this embodiment will be described below. In this embodiment, among control processes performed by the air conditioning controller 40, the control processes for the respective operation modes performed in step S9 of FIG. 3 and in steps S140 and S150 of FIG. 4 are different from those of the first embodiment. The control process associated with the main routine is the same as that of the first embodiment, and thus the control processes for the respective operation modes different from those of the first embodiment will be described below.

First, the cooling operation mode of this embodiment will be described below. In the cooling operation mode, the air conditioning controller 40 determines the operating states of the respective air conditioning control devices connected to the output side of the air conditioning controller 40 based on the target air outlet temperature TAO and the detection signal from the sensor group 41.

For example, the control signal output to the servo motor of the air mix door 34 is determined such that the air mix door 34 closes an air passage of the heater core 62, and that the whole volume of air having passed through the interior evaporator 17 can pass through the cool air bypass passage 35. The refrigerant discharge capacity of the compressor 11 and the control signal output to the second expansion valve 16 are determined in the same way as that in the cooling operation mode of the first embodiment.

Thus, in the refrigeration cycle 10 in the cooling operation mode, the high-pressure refrigerant discharged from the compressor 11 flows into the exterior heat exchanger 14. The refrigerant flowing into the exterior heat exchanger 14 dissipates heat into the outside air blown from the blower fan 15 in the exterior heat exchanger 14. The refrigerant flowing from the exterior heat exchanger 14 flows into the second expansion valve 16, and is decompressed and expanded by the second expansion valve 16 into a low-pressure refrigerant.

The low-pressure refrigerant decompressed by the second expansion valve 16 flows into the interior evaporator 17, and absorbs heat from the air blown from the blower 32 to evaporate itself. Thus, the air is cooled. In the cooling operation mode, the air passage of the heater core 62 is closed by the air mix door 34, whereby the air having passed through the interior evaporator 17 is blown into the vehicle interior without being heated by the heater core 62.

The refrigerant flowing from the interior evaporator 17 flows into the accumulator 18, and is then separated into liquid and gas phases by the accumulator 18. The gas-phase refrigerant separated into by the accumulator 18 is sucked into the suction side of the compressor 11 and compressed by the compressor 11 again.

As mentioned above, in the cooling operation mode, the air passage of the heater core 62 is closed by the air mix door 34, so that the air cooled by the interior evaporator 17 can be blown into the vehicle interior. Thus, the cooling of the vehicle interior can be performed.

Subsequently, the normal heating operation mode of this embodiment will be described below. In the normal heating operation mode, the air conditioning controller 40 determines the operating states of the respective air conditioning control devices connected to the output side of the air conditioning controller 40 based on the target air outlet temperature TAO and the detection signals from the sensor group 41.

For example, the refrigerant discharge capacity of the compressor 11 is determined to be the minimum capacity, that is, to stop the operation of the compressor 11. Thus, the operation of the refrigeration cycle 10 is substantially stopped, which reduces the amount of refrigerant flowing into the interior evaporator 17 substantially to zero.

The control signal output to the servo motor of the air mix door 34 is determined such that the air mix door 34 closes the cool air bypass passage 35, and that the whole volume of air having passed through the interior evaporator 17 can pass through the air passage of the heater core 62. Thus, in the normal heating operation mode, the air blown from the blower 32 flows into the heater core 62 and is heated by the heater core 62 without being cooled by the interior evaporator 17.

As mentioned above, in the normal heating operation mode, the operation of the refrigeration cycle 10 is stopped, and the cool air bypass passage 35 is closed by the air mix door 34, so that the air blown from the blower 32 can be heated to a desired temperature by the heater core 62 and blown into the vehicle interior without being cooled by the interior evaporator 17. Thus, the heating of the vehicle interior can be performed.

Subsequently, the dehumidification heating operation mode of this embodiment will be described below. In the dehumidification heating operation mode, the air conditioning controller 40 determines the operating states of the respective air conditioning control devices connected to the output side of the air conditioning controller 40 based on the target air outlet temperature TAO and the detection signals from the sensor group 41.

For example, the control signal output to the second expansion valve 16 is determined such that the super-cooling degree of the refrigerant flowing into the second expansion valve 16 approaches a target super-cooling degree previously determined so as to bring a COP closer to substantially the maximum value.

The control signal output to the servo motor of the air mix door 34 is determined such that the air mix door 34 closes the cool air bypass passage 35, and that the whole volume of air having passed through the interior evaporator 17 can pass through the air passage of the heater core 62.

Thus, in the refrigeration cycle 10 in the dehumidification heating operation mode, the high-pressure refrigerant discharged from the compressor 11 flows into the exterior heat exchanger 14. The refrigerant flowing into the exterior heat exchanger 14 dissipates heat into the outside air blown from the blower fan 15 in the exterior heat exchanger 14. The refrigerant flowing from the exterior heat exchanger 14 flows into the second expansion valve 16, and is decompressed and expanded by the second expansion valve 16 into a low-pressure refrigerant.

The low-pressure refrigerant decompressed by the second expansion valve 16 flows into the interior evaporator 17, and absorbs heat from the air blown from the blower 32 to evaporate itself. Thus, the air is dehumidified and cooled. In the dehumidification heating operation mode, the cool air bypass passage 35 is closed by the air mix door 34, whereby the air having passed through the interior evaporator 17 flows into the heater core 62 and is heated by the heater core 62 to be blown into the vehicle interior.

The refrigerant flowing from the interior evaporator 17 flows into the accumulator 18, and is then separated into liquid and gas phases by the accumulator 18. The gas-phase refrigerant separated into by the accumulator 18 is sucked into the suction side of the compressor 11 and compressed by the compressor 11 again.

As mentioned above, in the dehumidification heating operation mode, the cool air bypass passage 35 is closed by the air mix door 34, and the whole volume of air having passed through the interior evaporator 17 passes through the air passage of the heater core 62, so that the air dehumidified and cooled by the interior evaporator 17 can be heated by the heater core 62 to be blown into the vehicle interior. Thus, the dehumidification and heating of the vehicle interior can be achieved.

In this embodiment described above, when the refrigerant evaporation temperature of the interior evaporator 17 cannot be set lower than the dew-point temperature Tdew of the air flowing into the interior evaporator 17 in the heating operation, the normal heating operation mode is determined in which the operation of the compressor 11 is stopped with the flow rate of refrigerant into the interior evaporator 17 set substantially to zero.

Like the first embodiment, when the air cannot be dehumidified by use of the interior evaporator 17, the unnecessary heat exchange between the refrigerant and the air in the interior evaporator 17 can be suppressed to effectively reduce the waste of the energy in the vehicle air conditioner 1.

In this embodiment, the refrigeration cycle 10 has a cycle structure (accumulator cycle) including the accumulator 18 by way of example, but the present disclosure is not limited thereto. Alternatively, for example, a cycle structure (receiver cycle or sub-cool cycle) may be used which includes a receiver disposed on an outlet side of an exterior heat exchanger 14 for separating the refrigerant into vapor and liquid phases without using the accumulator 18.

Third Embodiment

Figure 14:
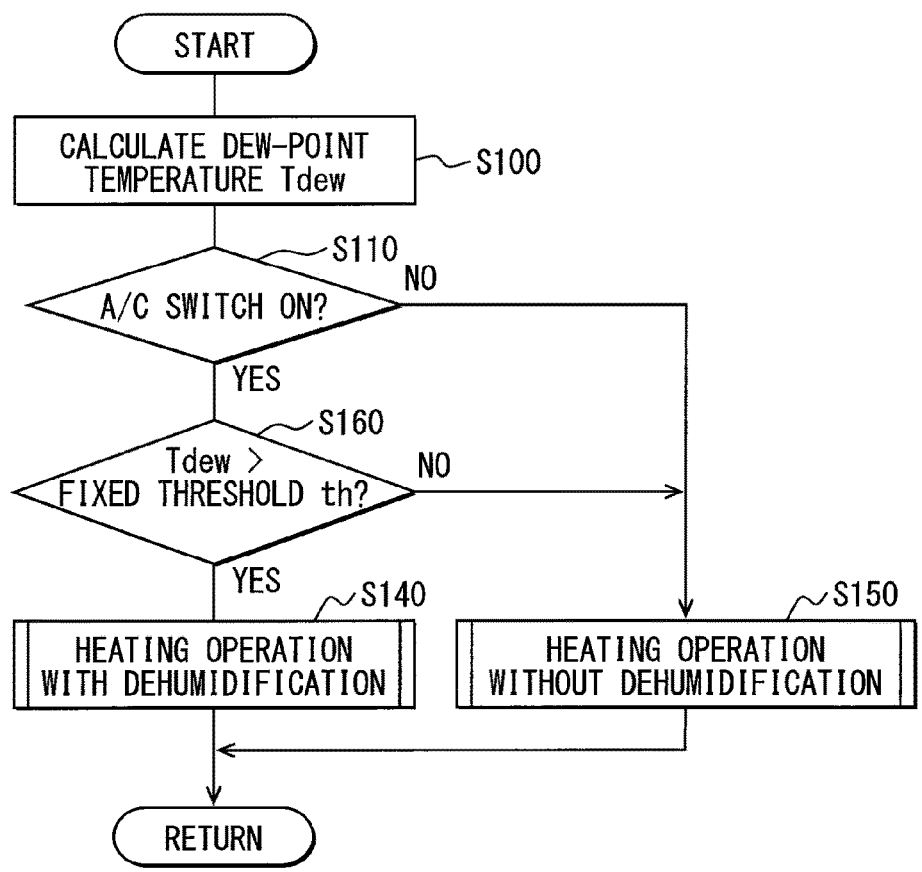
FIG. 14 is a flowchart showing the flow of a part of the control process performed by an air conditioning controller according to a third embodiment of the present disclosure.

A third embodiment of the present disclosure will be described with reference to FIG. 14. FIG. 14 shows a flowchart of the flow of a part of the control process performed by an air conditioning controller 40 according to this embodiment.

In the third embodiment, the control process for determining the normal heating operation mode or the dehumidification heating operation mode in the heating operation mode is changed with respect to the first embodiment, which will be described below by way of example. In this embodiment, the description of the same or equal parts as those of the first and second embodiments will be omitted or simplified below.

In this embodiment, as shown in FIG. 14, the processes in steps S120 and S130 of FIG. 4 described in the first embodiment will be changed to the process in step S160. Specifically, when the A/C switch is determined to be turned on in step S110 (if yes in step S110), the operation proceeds to step S160, in which it is determined whether the dehumidification of the air can be performed or not in the interior evaporator 17 based on the dew-point temperature Tdew calculated in step S100 and a fixed threshold (reference threshold) Th previously set to 0° C. or more. Specifically, in step S160, it is determined whether or not the dew-point temperature Tdew is higher than the fixed threshold Th as the reference threshold. In this embodiment, the process in step S160 performed by the air conditioning controller 40 serves as a determination portion for determining whether or not the dew-point temperature Tdew of the air flowing into the interior evaporator 17 is equal to or less than the reference threshold.

The fixed threshold Th is set to a value that makes it difficult to dehumidify the air in the interior evaporator 17 based on an experiment or simulation. The fixed threshold Th is set to, for example, a minimum temperature α (for example, 1° C.) of the target refrigerant-evaporation temperature TEO defined to prevent the frost formation of the interior evaporator 17.

When the dew-point temperature Tdew is determined to be higher than the fixed threshold Th in step S160 (if YES in step S160), the operation proceeds to step S140, in which the control process for the dehumidification heating operation mode (heating operation mode with the dehumidification) is performed. The determination of the target refrigerant-evaporation temperature TEO in step S120 described in the first embodiment is performed in the control process for the dehumidification heating operation mode.

Thus, when the dew-point temperature Tdew is determined to be equal to or less than the fixed threshold Th in step S160 (if NO in step S160), the operation proceeds to step S150, in which the control process for the normal heating operation mode (heating operation mode without the dehumidification) is performed. The basic contents of the control processes for the dehumidification heating operation mode and the normal heating operation mode are the same as those of the first and second embodiments, and thus the description thereof will be omitted below.

Like this embodiment described above, when the air cannot be dehumidified by the interior evaporator 17 even by use of the structure for determining the possibility of the dehumidification of the air by the evaporator 17 based on the predetermined fixed threshold Th and the dew-point temperature Tdew of air flowing into the evaporator 17, the unnecessary heat exchange between the air and refrigerant in the evaporator 17 can be suppressed to effectively reduce the waste of the energy in the vehicle air conditioner 1.

The present embodiment performs a determination process which involves comparing the dew-point temperature Tdew with the predetermined fixed threshold Th in step S160, and thus can simplify the control process of the air conditioning controller 40.

Other Embodiments

The preferred embodiments of the disclosure have been described above, but the disclosure is not limited thereto. The disclosed embodiments can be appropriately modified based on the knowledge normally owned by those skilled in the art without departing from the scope of the accompanied claims as long as those skilled in the art can easily replace the embodiment without being limited to the terms described in the claims. For example, the following various modifications can be made to the embodiments of the disclosure.

(1) In the above respective embodiments, the determination process of the target refrigerant-evaporation temperature TEO of the interior evaporator 17 is performed in step S120 of FIG. 4 such that the target refrigerant-evaporation temperature TEO is decreased according to a decrease in outside air temperature Tam by way of example. However, the invention is not limited thereto. Alternatively, the target refrigerant-evaporation temperature TEO may be determined based on a necessary amount and a thermal load of air conditioning of the vehicle interior except for the outside air temperature.

Figure 15:
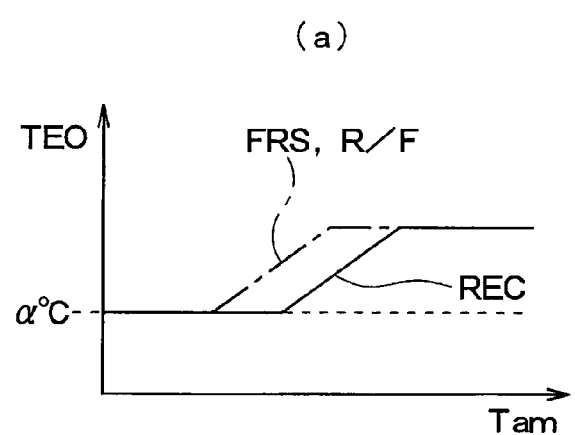
FIGS. 15($a$) and 15($b$) are diagrams showing control characteristic diagrams defining the relationship between an outside air temperature and a target refrigerant-evaporation temperature, and also defining the relationship between a target air outlet temperature and a target refrigerant-evaporation temperature according to other embodiments.
Figure 15:
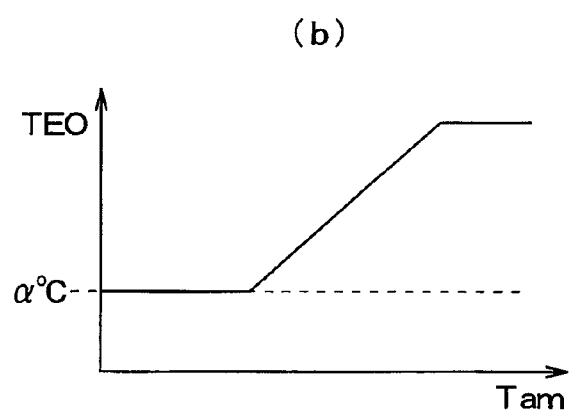

For example, as shown in the control characteristic diagram of FIG. 15($a$), the target refrigerant-evaporation temperature TEO may be determined according to the ratio of the introduced amount of the inside air to the outside air into the interior evaporator 17, in addition to the outside air temperature Tam.

In this case, in step S120, when selecting as the suction port mode, the inside air circulation mode REC having the highest ratio of introduction of the inside air to the outside air into the interior evaporator 17, the target refrigerant-evaporation temperature TEO is desirably determined to become low as compared to when selecting the inside/outside air introduction mode R/F or outside air introduction mode FRS. The mode R/F or FRS has a lower ratio of introduction of the inside air to the outside air into the evaporator 17 than that in the inside air circulation mode REC.

Thus, the target refrigerant-evaporation temperature TEO of the interior evaporator 17 is determined according to a dehumidification load of the vehicle interior, so that the air into the vehicle interior can be appropriately dehumidified by the interior evaporator 17.

Desirably, the target refrigerant-evaporation temperature TEO of the interior evaporator 17 is determined according to a dehumidification load of the vehicle interior. However, as shown in the control characteristic diagram of FIG. 15($b$), in step S120, the target refrigerant-evaporation temperature TEO may be determined to be decreased according to a decrease in target air outlet temperature TAO, which is a physical quantity in correlation to an air conditioning thermal load of the vehicle interior.

In step S120, a lower one of the target refrigerant-evaporation temperature TEO calculated with reference to the control characteristic diagram of FIG. 15($a$) and the target refrigerant-evaporation temperature TEO calculated with reference to the control characteristic diagram of FIG. 15($b$) may be selected as the target refrigerant-evaporation temperature TEO. In this way, the target refrigerant-evaporation temperature TEO can be determined according to the dehumidification load and air conditioning thermal load of the vehicle interior.

(2) In the above respective embodiments, in step S8 shown in FIG. 3, the cooling operation mode or the heating operation mode is determined based on the target air outlet temperature TAO and the operation signal of the A/C switch by way of example, but the present disclosure is not limited thereto. For example, when the preset temperature Tset of the vehicle interior is lower than the outside air temperature Tam, the operation mode may be determined to be the cooling operation mode. When the vehicle interior preset temperature Tset is higher than the outside air temperature Tam, the operation mode may be determined to be the heating operation mode.

(3) In the above respective embodiments, in each of the cooling operation mode, the normal heating operation mode, and the dehumidification heating operation mode, the air conditioning controller 40 operates the air mix door 34 to close either the cool air bypass passage 35 or the air passage of the interior condenser 12 or heater core 62, by way of example. However, the operation of the air mix door 34 is not limited thereto.

For example, the air mix door 34 may open both the cool air bypass passage 35, and the air passage of the interior condenser 12 or heater core 62. The temperature of air blown into the vehicle interior may be controlled by adjusting the ratio of flow rate of the air passing through the cool bypass passage 35 to that of the air passing through the air passage of the interior condenser 12 or heater core 62. Such control of the temperature is effective at fine adjustment of the temperature of the air with ease.

(4) In the above first embodiment, during the dehumidification heating operation mode, the operation mode is switched from the first dehumidification heating mode to the fourth dehumidification heating mode in stages with increasing in target air outlet temperature TAO, but the present disclosure is not limited thereto. For example, in the dehumidification heating operation mode, the operation mode may be continuously switched from the first dehumidification heating mode to the fourth dehumidification heating mode with increasing target air outlet temperature TAO. That is, the throttle opening degree of the first expansion valve 13 may be gradually decreased with increasing target air outlet temperature TAO, so that the throttle opening degree of the second expansion valve 16 may be gradually increased.

(5) In the above second embodiment described above, when the refrigerant evaporation temperature of the interior evaporator 17 cannot be set lower than the dew-point temperature Tdew of the air flowing into the interior evaporator 17, desirably, the operation of the compressor 11 is stopped with the flow rate of the refrigerant into the interior evaporator 17 set substantially to zero, but the disclosure is not limited thereto. Alternatively, for example, when the refrigerant evaporation temperature of the interior evaporator 17 cannot be set lower than the dew-point temperature Tdew of the air flowing into the interior evaporator 17, the refrigerant discharge capacity of the compressor 11 may be reduced to thereby decrease the flow rate of refrigerant into the interior evaporator 17.

(6) In the above respective embodiments, normal fluorocarbon refrigerant is used as the refrigerant for the refrigeration cycle 10 by way of example, but the refrigerant is not limited to this kind. For example, a hydrocarbon refrigerant, or carbon dioxide may be used. Further, the refrigeration cycle 10 may be formed as a supercritical refrigeration cycle whose high-pressure side refrigerant pressure exceeds the critical pressure of the refrigerant.

What is claimed is:

1. A vehicle air conditioner which cools air to be blown into a vehicle interior by using a refrigeration cycle with an evaporator evaporating refrigerant, the vehicle air conditioner comprising:
    a refrigerant flow-rate control portion controlling a flow rate of the refrigerant flowing into the evaporator;
    a dew-point temperature detection portion detecting a dew-point temperature of air flowing into the evaporator;
    an evaporator temperature determination portion determining a target refrigerant-evaporation temperature that is a target temperature of the evaporator; and
    a determination portion determining whether the dew-point temperature detected by the dew-point temperature detection portion is equal to or less than the target refrigerant-evaporation temperature, wherein
    the refrigerant flow-rate control portion reduces the flow rate of the refrigerant flowing into the evaporator, when the determination portion determines that the dew-point temperature detected by the dew-point temperature detection portion is equal to or less than the target refrigerant-evaporation temperature,
    the evaporator temperature determination portion determines the target refrigerant-evaporation temperature based on at least a physical quantity in correlation to a dehumidification load of the vehicle interior, and
    the evaporator temperature determination portion determines the target refrigerant-evaporation temperature to be lower in accordance with an increase in ratio of introduction of inside air to outside air, introduced into the evaporator.

2. The vehicle air conditioner according to claim 1, wherein the evaporator temperature determination portion determines the target refrigerant-evaporation temperature to be lower as an outside air temperature decreases.

3. The vehicle air conditioner according to claim 1, wherein the evaporator temperature determination portion determines the target refrigerant-evaporation temperature to be equal to or more than 0° C.

4. The vehicle air conditioner according to claim 1, wherein the target refrigerant-evaporation temperature is a predetermined fixed temperature.

5. The vehicle air conditioner according to claim 1, wherein the refrigeration cycle includes a bypass passage through which refrigerant flows while bypassing the evaporator, and a refrigerant circuit switching portion switching between a refrigerant circuit for circulating the refrigerant to a side of the evaporator and another refrigerant circuit for circulating the refrigerant to a side of the bypass passage,
    wherein when the dew-point temperature detection portion determines that the dew-point temperature detected by the determination portion is equal to or less than the target refrigerant-evaporation temperature, the refrigerant flow-rate control portion controls an operation of the refrigerant circuit switching portion so as to allow the refrigerant to flow to the side of the bypass passage.

6. The vehicle air conditioner according to claim 1, wherein the refrigeration cycle further includes a compressor compressing and discharging the refrigerant,
    wherein when the determination portion determines that the dew-point temperature detected by the dew-point temperature detection portion is equal to or less than the target refrigerant-evaporation temperature, the refrigerant flow-rate control portion reduces the refrigerant discharge capacity of the compressor.

7. The vehicle air conditioner according to claim 1, further comprising
    a heater heating air cooled by the evaporator.

8. The vehicle air conditioner according to claim 1, wherein while the dew-point temperature is equal to or less than the target refrigerant-evaporation temperature, the flow rate of the refrigerant flowing into the evaporator is set to approximately zero.

\* \* \* \* \*